US012449744B2

(12) United States Patent
Yang et al.

(10) Patent No.: US 12,449,744 B2
(45) Date of Patent: Oct. 21, 2025

(54) DEVELOPING CARTRIDGE

(71) Applicant: Zhuhai Ninestar Information Technology Co., Ltd, Zhuhai (CN)

(72) Inventors: Hao Yang, Zhuhai (CN); Qin Luo, Zhuhai (CN); Hailong Ma, Zhuhai (CN); Xianwen Wang, Zhuhai (CN); Wenjie Zhao, Zhuhai (CN); Xin Lv, Zhuhai (CN); Tiansheng Peng, Zhuhai (CN); Hao Deng, Zhuhai (CN); Xiaoming Liang, Zhuhai (CN); Wenjun Yu, Zhuhai (CN); Junyu Tao, Zhuhai (CN); Xiaolong Yang, Zhuhai (CN); Chen Cheng, Zhuhai (CN); Yongdi Chen, Zhuhai (CN)

(73) Assignee: Zhuhai Ninestar Information Technology Co. , Ltd, Zhuhai (CN)

( * ) Notice: Subject to any disclaimer, the term of this patent is extended or adjusted under 35 U.S.C. 154(b) by 0 days.

(21) Appl. No.: 19/029,999

(22) Filed: Jan. 17, 2025

(65) Prior Publication Data

US 2025/0164905 A1 May 22, 2025

Related U.S. Application Data

(63) Continuation of application No. PCT/CN2024/087275, filed on Apr. 11, 2024.

(30) Foreign Application Priority Data

Apr. 21, 2023 (CN) ......................... 202320924029.3
Sep. 22, 2023 (CN) ......................... 202322609512.5
(Continued)

(51) Int. Cl.
*G03G 15/08* (2006.01)
*G03G 21/16* (2006.01)
*G03G 21/18* (2006.01)

(52) U.S. Cl.
CPC ..... *G03G 15/0813* (2013.01); *G03G 15/0863* (2013.01); *G03G 15/0896* (2013.01); *G03G 21/1647* (2013.01); *G03G 21/1821* (2013.01)

(58) Field of Classification Search
CPC ........... G03G 15/0813; G03G 15/0863; G03G 15/0896; G03G 21/1647; G03G 21/1676; G03G 21/1817; G03G 21/1821
See application file for complete search history.

(56) References Cited

U.S. PATENT DOCUMENTS

2010/0166457 A1 7/2010 Hashimoto
2017/0269544 A1* 9/2017 Itabashi ............ G03G 21/1676
(Continued)

FOREIGN PATENT DOCUMENTS

CN 112506015 A 3/2021
CN 113552786 A 10/2021
(Continued)

OTHER PUBLICATIONS

The World Intellectual Property Organization (WIPO) International Search Report for PCT/CN2024/087275 Jun. 4, 2024 7 Pages (including translation).

*Primary Examiner* — Sophia S Chen
(74) *Attorney, Agent, or Firm* — Anova Law Group, PLLC

(57) ABSTRACT

A developing cartridge includes a casing, configured to accommodate developer therein, the casing having a first side and a second side arranged oppositely in a first direction, and a third side and a fourth side arranged oppositely in a second direction, the first direction and the second direction intersecting; a developing roller rotatable about a first axis extending in the first direction and positioned at the third side; a coupling rotatable about a second axis extending in the first direction and positioned at the first side; a storage medium including an electrical contact surface, the
(Continued)

electrical contact surface being positioned at the first side; a separation member protruding in the first direction, the separation member receiving a separation force to cause the casing to move, and the separation member being positioned at the first side; and a first abutting member being positioned at the second side.

19 Claims, 21 Drawing Sheets

(30) Foreign Application Priority Data

| | | |
|---|---|---|
| Oct. 20, 2023 | (CN) | 202322830698.7 |
| Nov. 15, 2023 | (CN) | 202323088502.8 |

(56) References Cited

U.S. PATENT DOCUMENTS

| | | | | |
|---|---|---|---|---|
| 2018/0046131 | A1* | 2/2018 | Itabashi | G03G 21/1676 |
| 2021/0216037 | A1* | 7/2021 | Dai | G03G 21/1842 |
| 2024/0176282 | A1* | 5/2024 | Abe | G03G 21/1676 |

FOREIGN PATENT DOCUMENTS

| | | | |
|---|---|---|---|
| CN | 217902255 | U | 11/2022 |
| CN | 218647315 | U | 3/2023 |
| JP | 2008170950 | A | 7/2008 |
| JP | 2019152846 | A | 9/2019 |
| WO | 2022037532 | A1 | 2/2022 |

* cited by examiner

DEVELOPING CARTRIDGE

CROSS-REFERENCE TO RELATED DISCLOSURE

This application is a continuation of International Application No. PCT/CN2024/087275, filed Apr. 11, 2024, which claims priority of Chinese Patent Application No. 202320924029.3 filed on Apr. 21, 2023, Chinese Patent Application No. 202322609512.5 filed on Sep. 22, 2023, Chinese Patent Application No. 202322830698.7 filed on Oct. 20, 2023, and Chinese Patent Application No. 202323088502.8 filed on Nov. 15, 2023, the entire content of each of which is hereby incorporated by reference.

TECHNICAL FIELD

The present disclosure relates to the technical field of image-forming devices, and in particular to a developing cartridge.

BACKGROUND

A developing cartridge is a detachable part widely used in image-forming devices, and the developing cartridge includes a developing roller. An image-forming device is generally equipped with four developing cartridges to correspond to the four photosensitive drums on the image-forming device. Each developing cartridge contains developer of a different color. The developing roller contacts the photosensitive drum and transfers the developer to the photosensitive drum, so that the image-forming device can use developers of various colors to form better images and meet more printing needs of users. To avoid damage of a developing roller or the photosensitive drum due to long-term contact between the developing roller and the photosensitive drum, the developing roller will be separated from the photosensitive drum when the developing cartridge does not need to act. Therefore, a separation member will be provided on the developing cartridge, and the separation member is used to receive a separation force provided by the image-forming device, so that the developing roller is out of contact with the photosensitive drum, and the imaging quality of the image-forming device is ensured. In the existing technologies, separation force receiving members need to be provided at both ends of a developing cartridge to separate the two ends of the developing roller from the photosensitive drum at the same time, but this results in a complex structure of the developing cartridge, more parts, and high cost.

SUMMARY

According to one aspect of the present disclosure, there is provided a developing cartridge that includes a casing configured to accommodate developer therein, the casing having a first side and a second side arranged oppositely in a first direction, and a third side and a fourth side arranged oppositely in a second direction, the first direction and the second direction intersecting; a developing roller rotatable about a first axis extending in the first direction, the developing roller being positioned at the third side; a coupling rotatable about a second axis extending in the first direction, the coupling being positioned at the first side; a storage medium, including an electrical contact surface, the electrical contact surface being positioned at the first side; a separation member protruding in the first direction, the separation member receiving a separation force to drive the casing to move, and the separation member being positioned at the first side; and a first abutting member being positioned at the second side.

In some embodiments, the developing roller contacts a photosensitive drum of a drum cartridge, the first abutting member contacts the drum cartridge, the separation member causes the developing roller to be out of contact with the photosensitive drum, and the first abutting member is positioned outside a contact position of the developing roller with the photosensitive drum in the first direction.

In some embodiments, when the developing roller is out of contact with the photosensitive drum, a gap between the developing roller and the photosensitive drum gradually decreases in a direction from the first side to the second side in the first direction.

In some embodiments, the first abutting member is farther away from the electrical contact surface than the second axis in the second direction.

In some embodiments, the first abutting member at least partially overlaps the developing roller when viewed in the first direction.

In some embodiments, a guided part is provided at the second side, the first abutting member protrudes radially relative to the guided part, and the first abutting member is an arc-shaped concave portion.

In some embodiments, a guided part is provided at the first side, and the separation member protrudes in the first direction relative to the guided part.

In some embodiments, the developing cartridge further includes a second abutting member positioned at the second side, and the second abutting member extends in the first direction.

In some embodiments, in a third direction intersecting the first direction and the second direction, the second abutting member is positioned above the first abutting member, the second abutting member abuts against another external component, the other external component is different from the external component, and the second abutting member keeps the first abutting member and the external component in abutment.

In some embodiments, the separation member includes a separation slope intersecting the first direction and the second direction, and the separation member drives the casing to swing.

In some embodiments, the separation member drives the casing to swing with the first abutting member as a fulcrum.

In some embodiments, the developing cartridge further includes a forced pushing part, the forced pushing part is positioned at the second side, is made of a conductive material, and in the second direction, the forced pushing part is closer to the fourth side than the first abutting member.

According to another aspect of the present disclosure, there is provided a developing cartridge detachably mounted on a drum cartridge including a photosensitive drum, the developing cartridge including a casing configured to accommodate developer therein, the casing having a first side and a second side arranged oppositely in a first direction, and a third side and a fourth side arranged oppositely in a second direction, the first direction and the second direction intersecting; a developing roller rotatable about a first axis extending in the first direction, the developer roller being positioned at the third side, and the developing roller contacting the photosensitive drum; a coupling rotatable about a second axis extending in the first direction, the coupling being positioned at the first side; a storage medium including an electrical contact surface, the electrical contact surface being positioned at the first side; a separation member being positioned at the second side, the separation member receiving a separation force to drive the second side to move in a direction away from the photosensitive drum; and a first abutting member being positioned at the first side, and the first abutting member contacting an external component to cause the first side to move in a direction away from the photosensitive drum.

In some embodiments, the second side is provided with a second abutting member, the second abutting member contacts another external component, the other external component is not used as the external component, the second abutting member is arranged diagonally with the first abutting member, and in the second direction, a distance between the second abutting member and the developing roller is smaller than a distance between the first abutting member and the developing roller.

In some embodiments, the casing moves away from the photosensitive drum by swinging with the first abutting member and the second abutting member as fulcrums.

In some embodiments, the first side is provided with a bracket, the bracket supports the electrical contact surface, the bracket is the first abutting member; and the second side is provided with a guided part, and the guided part is the second abutting member.

In some embodiments, a contact position of the first abutting member with the external component is positioned outside a contact position of the developing roller with the photosensitive drum in the first direction.

In some embodiments, when the developing roller is out of contact with the photosensitive drum, a gap between the developing roller and the photosensitive drum gradually decreases in a direction from the second side to the first side in the first direction.

In some embodiments, the separation member slides relative to the casing after receiving the separation force, and a sliding direction of the separation member intersects with the first direction, the separation member includes a force-bearing part and a force-applying part, the force-bearing part receives the separation force to make the separation member move relative to the casing, and the force-applying part is an inclined surface whose extension direction intersects with the first direction and the second direction.

In some embodiments, the developing further includes a forced pushing part, the forced pushing part is positioned at the second side, the forced pushing part is made of a conductive material, the forced pushing part receives a forced pushing force, and the forced pushing force acts in a direction opposite to the separation force.

Other features of the present disclosure and advantages thereof will become apparent from the following detailed description of exemplary embodiments of the present disclosure with reference to the accompanying drawings.

DETAILED DESCRIPTION

Figure 1:
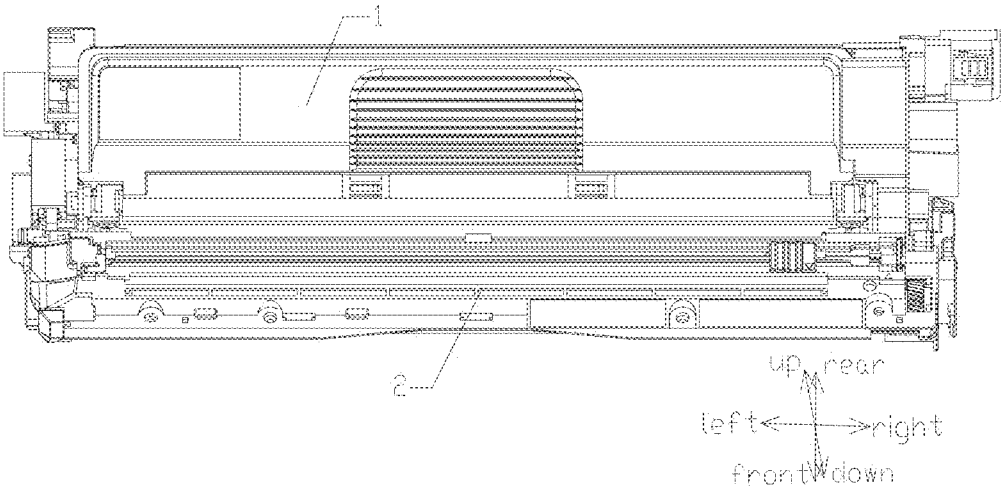
FIG. 1 is a schematic structural diagram of a developing cartridge mounted on a drum cartridge in Embodiment 1.
Figure 2:
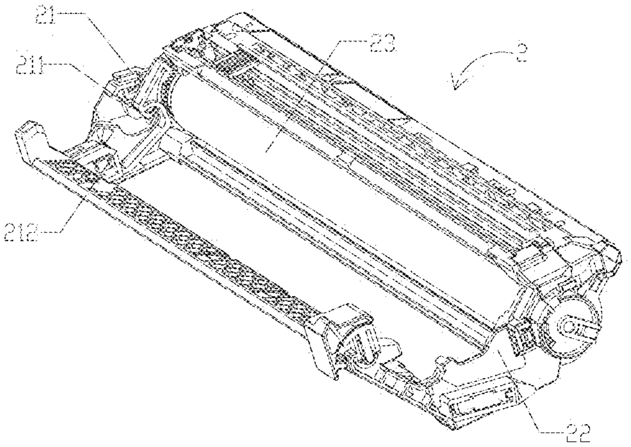
FIG. 2 is a schematic structural diagram of a drum cartridge in Embodiment 1.
Figure 3:
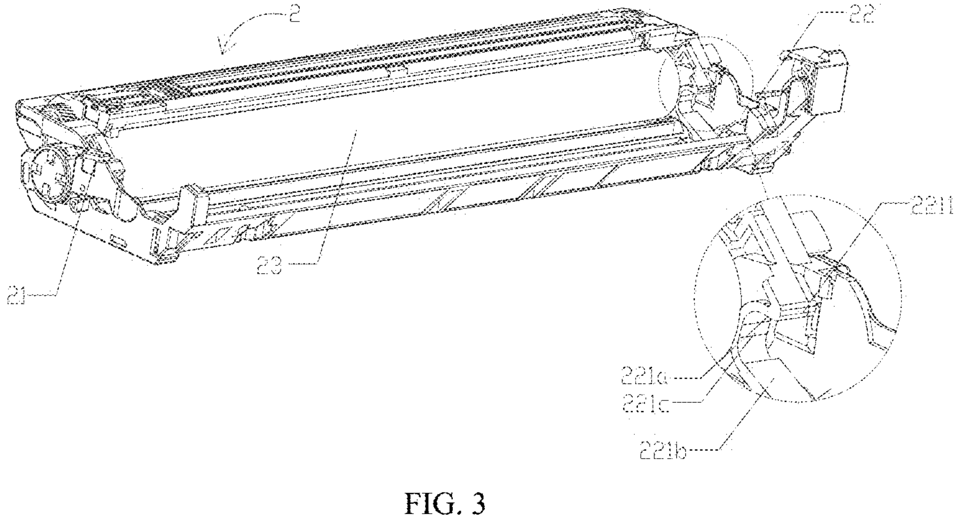
FIG. 3 is a structural schematic diagram of a drum cartridge in Embodiment 1 from another perspective.

The disclosure is further described in detail hereinafter with reference to the accompanying drawings. Apparently, the described embodiments are merely part of the embodiments of the disclosure, not all of the embodiments. Based on the embodiments of the disclosure, all other embodiments obtained by a person skilled in the art without creative work are within the scope of protection of the disclosure.

It should be noted that the terms "first", "second", etc., are merely used for descriptive purposes and should not be understood as indicating or implying relative importance or implicitly indicating the number of the indicated technical features. Therefore, the features defined as "first" or "second" may explicitly or implicitly include at least one of the features. In the description of the present disclosure, the meaning of "plurality" is at least two, such as two, three, etc., unless otherwise clearly and specifically defined.

In the present disclosure, unless otherwise clearly defined and limited, the terms "installation", "connection", "fixation" and the like should be understood in a broad sense, for example, it can be a fixed connection, a detachable connection, or an integral connection; it can be a mechanical connection, an electrical connection, or communication with each other; it can be a direct connection or an indirect connection through an intermediate medium, or it can be an internal connection of two elements or the interaction relationship between two elements, unless otherwise clearly defined. For a person skilled in the art, the specific meanings of the above terms in the present disclosure can be understood according to specific circumstances.

In the present disclosure, unless otherwise clearly specified and limited, a first element being "above" or "below" a second element may mean that the first and second elements are in direct contact, or the first and second elements are in indirect contact through an intermediate medium. Moreover, a first element being "over", "above" or "on top of" a second element may mean that the first element is directly above or obliquely above the second element, or simply means that the first element is higher in level than the second element. A first element being "below", "under" or "underneath" a second element may mean that the first element is directly below or obliquely below the second element, or simply means that the first element is lower in level than the second element.

In the above description, the description with reference to the terms "one embodiment", "some embodiments", "example", "specific example", or "some examples" and so on means that the specific features, structures, materials, or characteristics described in conjunction with the embodiment or example are included in at least one embodiment or example of the disclosure. In this specification, the schematic representations of the above terms do not necessarily refer to the same embodiment or example. Moreover, the specific features, structures, materials, or characteristics described may be combined in any one or more embodiments or examples in a suitable manner. In addition, those skilled in the art may mix and combine the different embodiments or examples and the features of the different embodiments or examples described in this specification, without contradiction.

In the following description of directions, when viewed perpendicularly to the paper surface in FIG. 1, the left side of the paper surface in FIG. 1 is left, the right side of the paper surface in FIG. 1 is right, the upper side of the paper surface in FIG. 1 is top, the lower side of the paper surface in FIG. 1 is bottom, the near side of the paper surface in FIG. 1 is front, and the far side of the paper surface in FIG. 1 is rear. The left-right direction is an embodiment of the first direction, the front-back direction is an embodiment of the second direction, and the up-down direction is an embodiment of the third direction. The first direction, the second direction, and the third direction intersect each other, optionally perpendicularly.

Embodiment 1

As shown in FIGS. 1 to 11, Embodiment 1 provides a developing cartridge 1 which is detachably mounted on a drum cartridge 2 of an image-forming device. A separation force output member 91 and a recognition slot 92 are provided on the image-forming device. An electric contact pin is provided in the recognition slot 92.

The drum cartridge 2 is used to carry the developing cartridge 1. The drum cartridge 2 includes a first sidewall 21, a second sidewall 22, and a photosensitive drum 23. The photosensitive drum 23 is rotatably supported by the first sidewall 21 and the second sidewall 22. The photosensitive drum 23 receives developer provided by the developing cartridge 1 to form an electrostatic latent image. A first guide opening 211 is provided at the first sidewall 21, and a second guide opening 221 is provided at the second sidewall 22. The first guide opening 211 and the second guide opening 221 are both arc-shaped openings for guiding the developing cartridge 1 to be smoothly mounted on the drum cartridge 2. The first guide opening 211 and the second guide opening 221 have a similar structure. The specific structure is described by taking the second guide opening 221 as an example. The second guide opening 221 includes a first guide surface 221*a*, a second guide surface 221*b*, and an abutted surface 221*c*. The abutted surface 221*c* connects the front end of the first guide surface 221*a* and the front end of the second guide surface 221*b* to form a U-shaped groove structure. The first guide surface 221*a* and the second guide surface 221*b* extend approximately in the front-to-back direction. The first guide surface 221*a* is positioned on the upper side of the second guide surface 221*b*. The first guide surface 221*a* and the second guide surface 221*b* are spaced apart from each other in the up-down direction. The abutted surface 221*c* is an arc surface. The second guide opening 221 also includes a first abutted part 2211, which is disposed at the end of the first guide surface 221*a* away from the abutted surface 221*c*. The drum cartridge 2 also includes a force-applying assembly, which is used to apply a pushing force to the developing cartridge 1 so that the photosensitive drum 23 can receive the developer more stably. The force-applying assembly includes a first force-applying member 212 disposed near the first sidewall 21 and a second force-applying member 222 disposed near the second sidewall 22. Both the first force-applying member 212 and the second force-applying member 222 are connected to an elastic member and can move relative to the photosensitive drum 23.

As shown in FIGS. 4 to 8, the developing cartridge 1 includes a casing 10, a developing assembly, a transmission assembly, a separation member, and a recognition assembly.

The casing 10 is configured to accommodate developer therein. The casing 10 has a first side 11 and a second side 12 arranged oppositely in the first direction. The casing 10 has a third side 13 and a fourth side 14 arranged oppositely in the second direction. The casing 10 has a fifth side 15 and a sixth side 16 arranged oppositely in the third direction. The casing 10 is provided with a friction part 151. The friction part 151 is provided with a plurality of ribs extending in the first direction. The friction part 151 is configured to facilitate a user to pick up the developing cartridge 1. The transmission assembly is positioned at the first side 11, and is configured to receive the driving-force output by the image-forming device so that the developing assembly in the developing cartridge 1 is driven. A first protective cover 111 is detachably fixedly mounted on the first side 11 of the casing 10 by means of screws 48. The first protective cover 111 at least covers part of the transmission assembly. The first protective cover 111 is configured to protect the transmission assembly.

Figure 4:
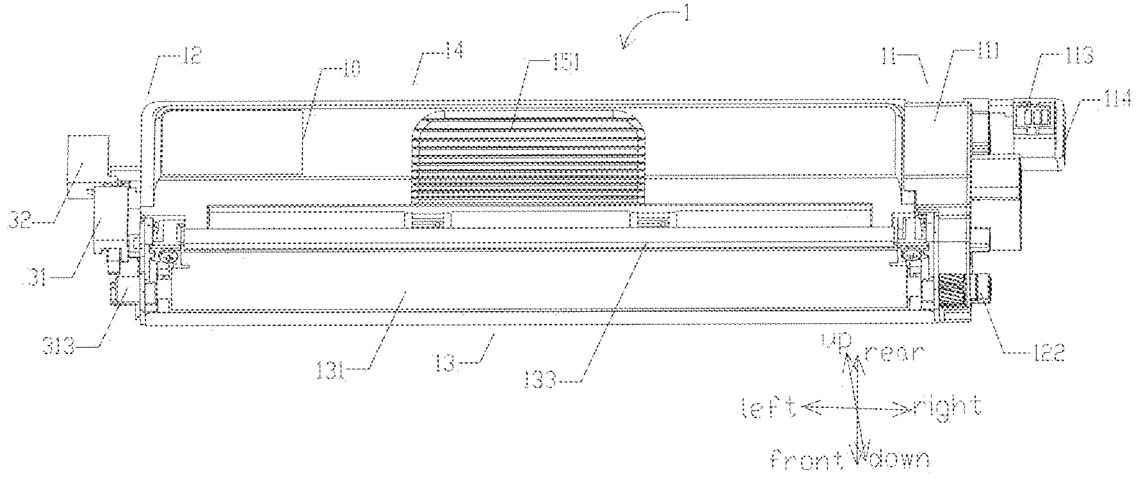
FIG. 4 is a schematic structural diagram of a developing cartridge in Embodiment 1.
Figure 5:
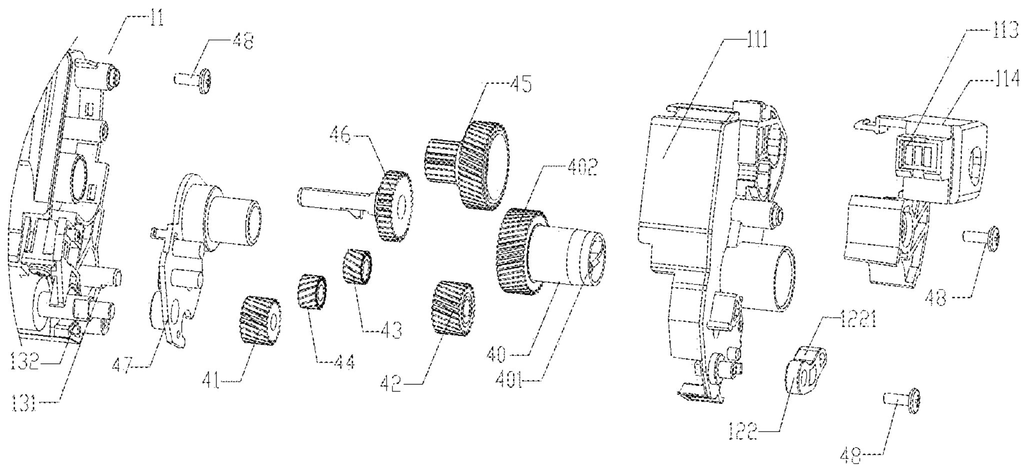
FIG. 5 is an exploded view of a first side of a developing cartridge in Embodiment 1.

As shown in FIGS. 4 and 5, the recognition assembly is positioned at the first side 11. In the disclosed embodiment, the recognition assembly is specifically a storage medium 113. The storage medium 113 is configured to store information of the developing cartridge 1. When the developing cartridge 1 is mounted in the image-forming device, the information is transmitted to the image-forming device so that the developing cartridge 1 is recognized by the image-forming device. The storage medium 113 includes an electrical contact surface integrally formed therewith or separately connected therewith, and the electrical contact surface contacts the electrical contact pin in the recognition slot 92 so that the information in the storage medium 113 is transmitted to the image-forming device.

A holder 114 is fixedly provided at the first side 11. The holder 114 is firstly snapped onto the first protective cover 111 by means of a buckle, and then further fixed onto the first protective cover 111 by means of a screw 48, so that the holder 114 is indirectly fixedly mounted on the casing 10. In some embodiments, the holder 114 may be directly fixed onto the casing 10. The storage medium 113 is mounted on the holder 114, and neither the holder 114 nor the storage medium 113 can move relative to the casing 10. When the developing cartridge 1 is mounted to the drum cartridge 2, the holder 114 and the storage medium 113 are mounted together in the image-forming device, the holder 114 contacts external components such as the recognition slot 92 as a first abutting member or a limited member. In some embodiments, the storage medium 113 can move relative to the casing 10.

As shown in FIGS. 4 and 5, the developing assembly includes a developing roller 131, a developer feeding roller 132, and a agitator (not shown), and the developing roller 131, the agitator, and the developer feeding roller 132 are all rotatably supported by the casing 10. The rotation axes of the developing roller 131, the agitator, and the developer feeding roller 132 all extend in the first direction. The developer feeding roller 132 is arranged adjacent to the developing roller 131, and in the second direction, the developing roller 131 is closer to the third side 13 of the casing 10 than the developer feeding roller 132. The developer feeding roller 132 transfers the developer to the developing roller 131. In some embodiments, the developer feeding roller 132 may not rotate, and may transfer the developer to the developing roller 131 by friction. The agitator is configured to stir the developer in the developing chamber, so that the developer generates friction to prevent the developer from agglomerating. The developing roller 131 is configured to contact the photosensitive drum 23 to transfer the developer to the photosensitive drum 23.

The developing cartridge 1 further includes a layer thickness regulating blade 133, which is disposed adjacent to the developing roller 131 and extends in a first direction. The layer thickness regulating blade 133 is configured to contact the developing roller 131 to control the thickness of the developer layer on the developing roller 131.

Figure 6:
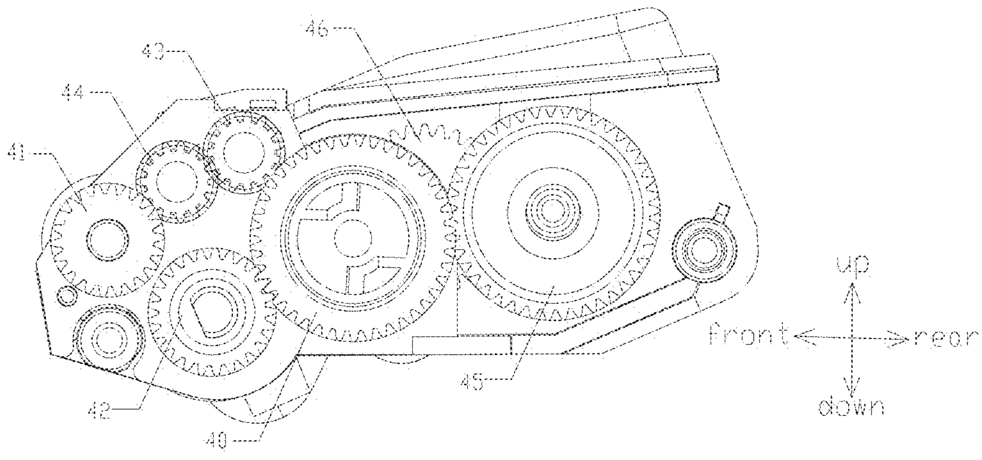
FIG. 6 is a side view of a first side of a developing cartridge in Embodiment 1.

As shown in FIGS. 5 and 6, the transmission assembly is arranged at the first side 11 of the casing 10, and the transmission assembly includes a coupling 40. The coupling 40 includes a force receiving part 401 and a driving gear 402, which can be integrally formed or combined. In the first direction, the driving gear 402 is closer to the first side 11 than the force receiving part 401. The force receiving part 401 is configured to receive external driving-force, which, in the disclosed embodiment, is the driving-force output by the image-forming device, and drives the driving gear 402 to rotate.

The transmission assembly also includes a developing gear 41, a developer feeding gear 42, a first idler gear 43, a second idler gear 44, a third idler gear 45, and a agitator gear 46. The developer feeding gear 42 is meshed with the driving gear 402 to receive driving-force and rotate. The first idler gear 43 is meshed with the driving gear 402 and the second idler gear 44 at the same time to receive driving-force and transmit the driving-force to the second idler gear 44. The second idler gear 44 is meshed with the developing gear 41 to transmit driving-force. The third idler gear 45 is meshed with the driving gear 402 and the agitator gear 46 at the same time to transmit driving-force to the agitator gear 46. In the disclosed embodiment, the third idler gear 45 is optionally a two-stage gear to reduce the rotation speed of the agitator gear 46. In other embodiments, the agitator gear 46 can be directly meshed with the driving gear 402. The developing gear 41 is fixedly mounted on one end of the developing roller 131 positioned at the first side 11 through a D-shaped opening and drives the developing roller 131 to rotate. The developer feeding gear 42 is fixedly mounted on one end of the developer feeding roller 132 positioned at the first side 11 through a D-shaped opening and drives the developer feeding roller 132 to rotate. The agitator gear 46 is mounted on one end of the agitator positioned at the first side 11 and drives the agitator to rotate. The disclosed embodiment does not limit the number of gears and the meshing relationship of the transmission assembly, which can be set according to actual needs.

A first bearing 47 is also provided at the first side 11, and the first bearing 47 is configured to support the developing roller 131 and the developer feeding roller 132 positioned at one end of the first side 11. Optionally, a plurality of support columns are provided on the first bearing 47, and the plurality of support columns can rotatably support a first idler gear 43, a second idler gear 44, a third idler gear 45, and a coupling 40 respectively.

The developing cartridge 1 also includes a guided component, which allows the developing cartridge 1 to be smoothly mounted on the drum cartridge 2. The guided component includes a first guided part 122 and a second guided part 313 in an arc shape. The first guided part 122 is positioned at the first side 11, and the second guided part 313 is positioned at the second side 12. The projections of the first guided part 122 and the second guided part 313 overlap with the projection of the axis of the developing roller 131 in the first direction. In the disclosed embodiment, the first guided part 122 is optionally detachably mounted on the first protective cover 111, or the first guided part 122 can be formed integrally with the first protective cover 111. The first guided part 122 and the second guided part 313 are respectively guided by the first guide opening 211 and the second guide opening 221 to facilitate the mounting of the developing cartridge 1.

The second guided part 313 is provided with a first abutting surface for abutting against the second guide opening 221 when the developing cartridge is mounted on the drum cartridge 2. The first abutting surface is the circumferential surface of the second guided part 313. The first abutting surface is configured to abut against the abutted surface 221*c* of the second guide opening 221. That is, in the disclosed embodiment, the second guided part 313 can be considered as a second abutting member contacting with an external component.

The developing cartridge 1 also includes a forced pushing assembly. When the developing cartridge 1 is mounted on the drum cartridge 2, the forced pushing assembly is abutted by the force-applying assembly so that the developing cartridge 1 receives the forced pushing force applied by the drum cartridge 2, so that the developing roller 131 is in close contact with the photosensitive drum 23. The forced pushing assembly includes a first forced pushing part 1221 positioned at the first side 11 and a second forced pushing part 312 positioned at the second side 12. The first forced pushing part 1221 is abutted by the first force-applying member 212 to receive the forced pushing force. In the disclosed embodiment, the first forced pushing part 1221 is formed integrally with the first guided part 122 to simplify the structure of the developing cartridge 1 and reduce the number of parts. In other embodiments, the first forced pushing part 1221 and the first guided part 122 can be separate units that are combined. In the second direction, the first forced pushing part 1221 is closer to the storage medium 113 than the first guided part 122.

Figure 7:
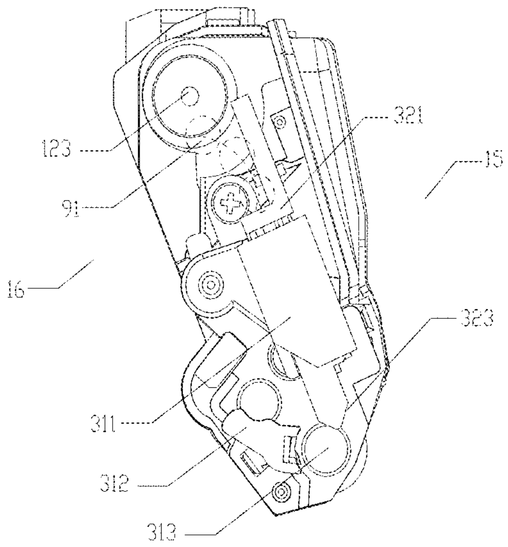
FIG. 7 is a side view of a second side of a developing cartridge in Embodiment 1.
Figure 8:
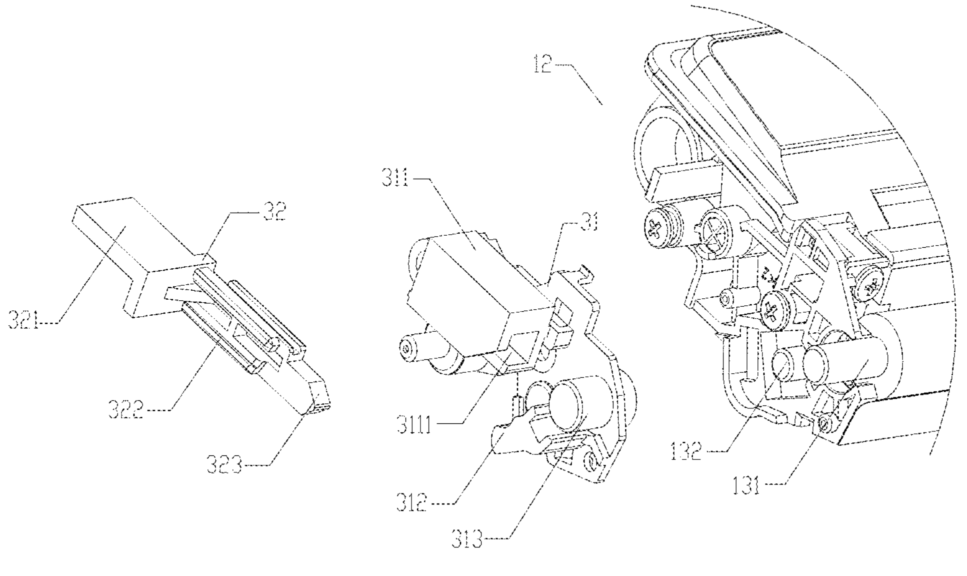
FIG. 8 is an exploded view of a second side of a developing cartridge in Embodiment 1.

As shown in FIGS. 7 and 8, a support member 31 is provided at the second side 12, and the support member 31 is fixedly mounted on the casing 10 by means of screws or the like. The support member 31 includes a support part 311, a second forced pushing part 312, and a second guided part 313. The second forced pushing part 312 is symmetrically arranged with the first forced pushing part 1221, and the second forced pushing part 312 is abutted by the second force-applying member 222 to receive the forced pushing force. The second guided part 313 is a cylindrical protrusion extending in the first direction, and the second guided part 313 is guided by the second guide opening 221 to facilitate the mounting of the developing cartridge 1. The interior of the support part 311 is hollow, and a guide rail is provided inside, and the guide rail extends toward the direction (front-rear direction) close to the developing roller 131, and openings 3111 are provided at both ends of the extension. The developing roller 131 and the developer feeding roller 132 are rotatably supported by the support member 31 at one end of the second side 12, that is, the support member 31 can be considered as a second bearing supporting the developing roller 131 and the developer feeding roller 132. In the disclosed embodiment, the support member 31 is made of a conductive material, and the second forced pushing part 312 contacts the electrode in the drum cartridge 2 so that the second forced pushing part 312 receives the voltage (power) output by the image-forming device through the drum cartridge 2. That is, the second forced pushing part 312 can be considered as the electric receiving part in the disclosed embodiment, which receives the external voltage and transmits the voltage to the developing roller 131 and the developer feeding roller 132, so that the developing roller 131 and the developer feeding roller 132 are charged to absorb the developer. In other embodiments, in order to save the production cost of the developing cartridge 1, the support part 311 and the electric receiving part can be separately provided, and then the voltage is transmitted to the developing roller 131 and the developer feeding roller 132 through a conductive member such as an iron sheet.

Figure 11:
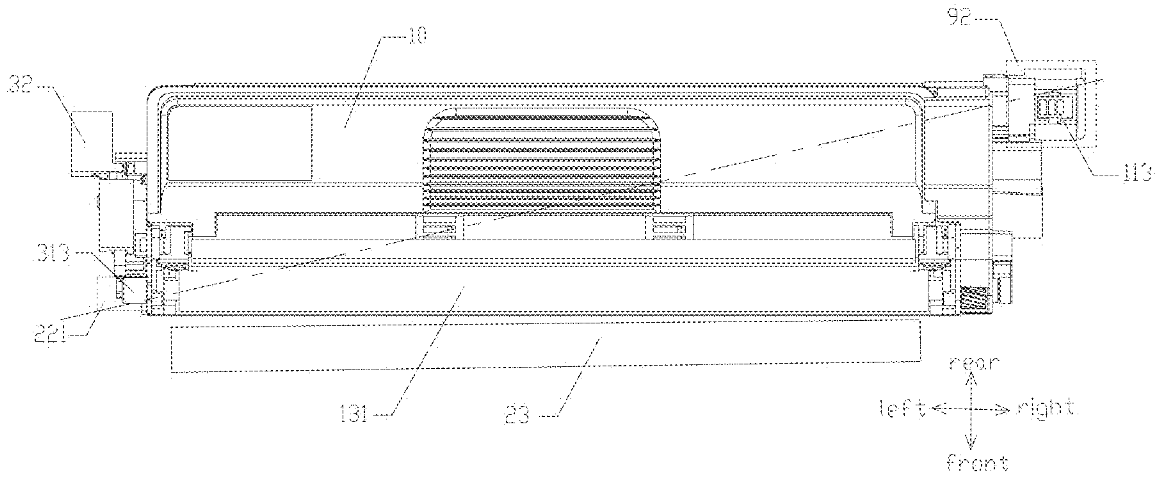
FIG. 11 is a schematic diagram of a second guided part and a holder in a diagonal shape in Embodiment 1.

As shown in FIG. 11, in the disclosed embodiment, the second guided part 313 and the holder 114 are optionally diagonal, and the second guided part 313 and the holder 114 do not overlap in the first direction, that is, the diagonal condition is satisfied. In the disclosed embodiment, the holder 114 is positioned at the first side 11 and close to the fourth side 14, and the second guided part 313 is positioned at the second side 12 and close to the third side 13. In the second direction, the distance between the second guided part 313 and the developing roller 131 is smaller than the distance between the holder 114 and the developing roller 131. Further, the holder 114 is positioned at the junction of the first side 11 and the fourth side 14, and the second guided part 313 is positioned at the junction of the second side 12 and the third side 13.

As shown in FIGS. 7 and 8, the separation member 32 is disposed at the second side 12 and is movably supported by the support member 31. The separation member 32 receives the separation force applied by the image-forming device, so that the developing cartridge 1 moves, thereby separating the developing roller 131 and the photosensitive drum 23.

The separation member 32 includes a force-bearing part 321, a supported part 322 and a force-applying part 323. The force-bearing part 321 and the force-applying part 323 are respectively positioned at two ends of the separation member 32. The force-bearing part 321 is farther away from the developing roller 131 than the force-applying part 323. The force-bearing part 321 is block-shaped, and can be plate-shaped or sheet-shaped. The force-bearing part 321 is abutted by the separation force output member 91 to receive the separation force, thereby causing the separation member 32 to slide relative to the casing 10, further move in a direction away from the fourth side 14, and cause the casing 10 to move in a direction away from the photosensitive drum 23. The supported part 322 is a strip-shaped part that cooperates with the guide rail in the support part 311. When the separation member 32 moves, the separation member 32 can be guided by the guide rail and slide along a predetermined trajectory. The force-applying part 323 is optionally a slope, and further optionally a smooth slope, whose extension direction intersects with the first direction. The slope includes an arc surface or other planes. After the separation member 32 moves under force, the force-applying part 323 abuts against the drum cartridge 2, causing the developing cartridge 1 to move relative to the drum cartridge 2.

As shown in FIG. 7, a developer-filling port 123 is further provided at the second side 12, through which the developer is filled into the casing 10, and a sealing cover is disposed at the developer-filling port 123, which is configured to seal the developer-filling port 123 to prevent the developer from leaking.

Figure 9:
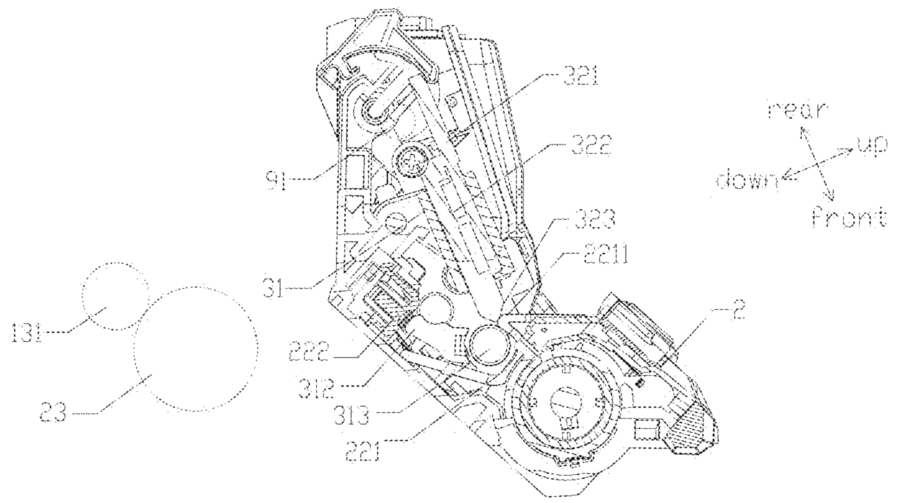
FIG. 9 is a cross-sectional view of a developing cartridge mounted to a drum cartridge without receiving a separation force in Embodiment 1.
Figure 10:
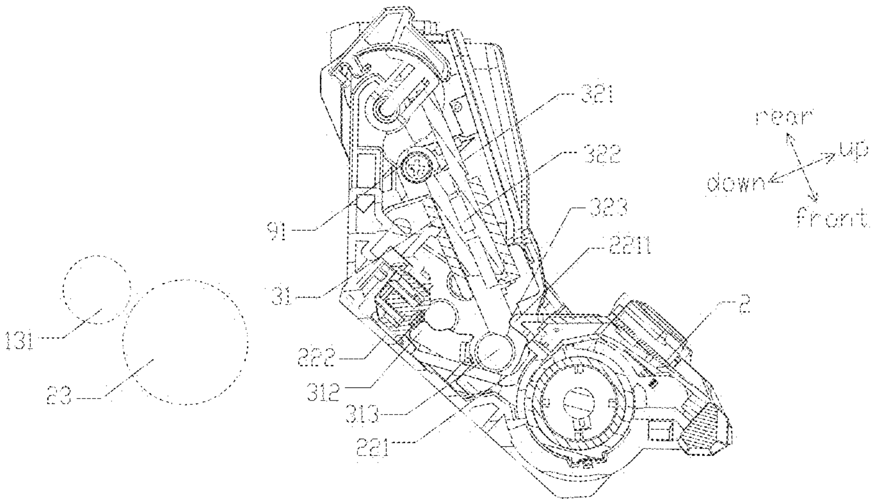
FIG. 10 is a cross-sectional view of a developing cartridge mounted to a drum cartridge to receive a separation force in Embodiment 1.

As shown in FIGS. 9 and 10, the developing cartridge 1 is mounted to the drum cartridge 2, and the two are mounted together in the image-forming device. When the separation force output member 91 does not output the separation force, the pushing assembly receives the pushing force applied by the force-applying assembly, so that the developing roller 131 maintains contact with the photosensitive drum 23, and the separation member 32 does not move relative to the casing 10. When the separation force output member 91 starts to output the separation force, the separation force output member 91 abuts against the force-bearing part 321 of the separation member 32. Accordingly, the separation member 32 moves relative to the casing 10, and the force-applying part 323 abuts against the first abutted part 2211 on the drum cartridge 2, and the first abutted part 2211 exerts a reaction force on the force-applying part 323. Since the force-applying part 323 has an inclined surface, when the force-applying part 323 receives the reaction force and transmits the reaction force to the casing 10, the casing 10 is driven to move in the direction away from the photosensitive drum 23, that is, the separation member 32 drives the casing 10 to move in the direction away from the photosensitive drum 23 during the process of being abutted by the separation force output member 91. Further, the second side 12 of the casing 10 overcomes the thrust force applied by the second force-applying member 222 and moves in the direction away from the photosensitive drum 23. Further, the second side 12 optionally moves in the direction away from the photosensitive drum 23 in a swinging manner, or the second side 12 can partially swing and partially translate when moving, and a part of the developing roller 131 is separated from the photosensitive drum 23.

As shown in FIGS. 10 and 11, when the force-applying part 323 abuts against the first abutted part 2211 to cause the second side 12 to move, the second guided part 313 abuts against the second guide opening 221. Since the second guided part 313 and the holder 114 are diagonally arranged and the holder 114 is limited by the recognition slot 92, the second guided part 313 abuts against the second guide opening 221, and the separation member continues to move in contact with the separation force and transmits the separation force to the casing 10. The first side 11 moves with the second side 12, and the first side 11 overcomes the thrust force applied by the first force-applying member 212 and moves in a direction away from the photosensitive drum 23. Furthermore, the first side 11 optionally moves in a swinging manner in a direction away from the photosensitive drum 23, or the first side 11 may partially swing and partially translate when moving, and another part of the developing roller 131 is separated from the photosensitive drum 23.

As shown in FIG. 11, it can be seen that the first distance generated by the movement of the second side 12 is greater than the second distance generated by the movement of the first side 11. That is, in the first direction from left to right, the gap between the developing roller 131 and the photosensitive drum 23 gradually decreases. In other words, the gap between the end of the developing roller 131 positioned at the second side 12 and the photosensitive drum 23 is greater than the gap between the other end positioned at the first side 11 and the photosensitive drum 23.

It is known that the holder 114 may not serve as the first abutting member, and a first abutting member may be separately provided at the first side 11, and the first abutting member may be limited or abutted by external components such as the recognition slot 92 or other components in the image-forming device. The first abutting member and the second guided part 313 may be diagonally opposite to each other, or a component abutting against the drum cartridge 2 may be separately provided at the second side 12, or the second guided part 313 may have no guiding function. That is, the first side 11 and the second side 12 may be both provided with the first abutting member and the second abutting member acting against the drum cartridge 2 or the internal components of the image-forming device. The first abutting member and the second abutting member respectively positioned at the first side 11 and the second side 12 may be diagonally opposite to each other, or may be incompletely diagonally opposite to each other.

After the separation force output member 91 stops outputting the separation force to the developing cartridge 1, the separation force output member 91 releases the contact with the separation member 32, and the developing cartridge 1 moves toward the direction close to the photosensitive drum 23 under the action of the force-applying component. The separation member 32 abuts against the first abutted part 2211 and moves in the reverse direction, and the developing roller 131 contacts the photosensitive drum 23 again.

Figure 12:
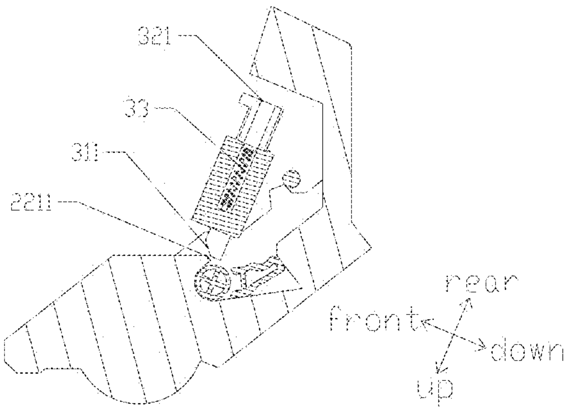
FIG. 12 is a partial cross-sectional view of a separation member when a developing cartridge is mounted to a drum cartridge in Embodiment 1.

Furthermore, in order to ensure that the separation member 32 can stably reversely move to reset, a reset elastic member 33 can be provided. The reset elastic member 33 accumulates elastic force when the separation member 32 is subjected to the separation force and moves. When the separation member 32 loses the separation force, the elastic member is released to reset the separation member 32 in the reverse direction. Specifically, as shown in FIG. 12, the reset elastic member 33 is provided between the separation member 32 and the support part 311. The reset elastic member 33 can be a compression spring and is provided in the support part 311. One end of the reset elastic member 33 abuts against the separation member 32, and the other end abuts against one end of the support part 311 close to the developing roller 131. The reset elastic member 33 is configured to apply a force to the separation member 32 to move in a direction away from the developing roller 131, so that the separation member 32 can reversely move and reset when it does not receive the separation force, so as to facilitate receiving the separation force next time. It is known that the limited member may not be provided at the first side 11, and the separation member 32 may be provided merely at the second side 12, and the separation member 32 enables the second side 12 of the casing 10 to move in a direction away from the photosensitive drum 23, and the developing roller 131 partially disengages from the photosensitive drum 23. That is, the disengagement in the disclosed embodiment may be complete disengagement or partial disengagement.

Figure 13:
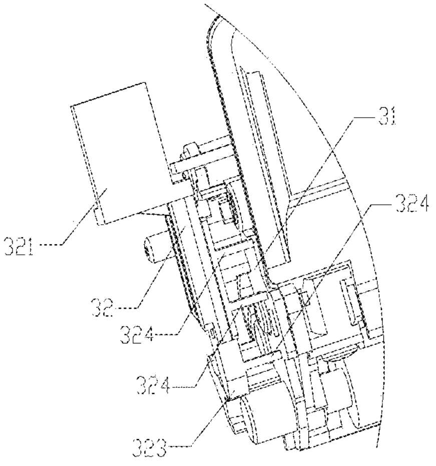
FIG. 13 is a schematic structural diagram of another separation member in Embodiment 1.

As shown in FIG. 13, in one embodiment, the separation member 32 does not slide relative to the casing 10, and a connection part 324 is arranged between the separation member 32 and the support member 31. The connection part 324, the separation member 32 and the support member 31 can be formed as one piece or can be separate units combined together. The connection part 324 is in the shape of a rib extending in the first direction. There are multiple connection parts 324, and the multiple connection parts 324 are arranged at intervals, and the intervals are hollow. The multiple connection parts 324 can ensure a stable connection between the separation member 32 and the support member 31. The hollow interval arrangement can make the connection parts 324 have a certain elastic deformation, and a connection part 324 can be considered as a cantilever.

When the separation member 32 receives the separation force applied by the image-forming device, the separation member 32 transmits the separation force to the connection part 324, and the connection part 324 undergoes a certain elastic deformation, thereby causing the force-applying part 323 of the separation member 32 to move to abut against the first abutted part 2211, so that the developing cartridge 1 moves relative to the drum cartridge 2. When the force-bearing part 321 is no longer abutted by the separation force output member 91, the connection part 324 restores the separation member 32 to the position when it does not receive the separation force according to its own elastic force.

In the disclosed embodiment, the parts that the developing cartridge 1 contacts with the drum cartridge 2 or the image-forming device are all external parts.

Embodiment 2

Unless otherwise specified, the structure of the developing cartridge in Embodiment 2 is the same as that in Embodiment 1. The difference compared with Embodiment 1 is that the structure of the separation member is different.

In the disclosed embodiment, the second sidewall 22 of the drum cartridge 2 has a second abutted part 2212, and the second abutted part 2212 is farther away from the photosensitive drum 23 than the first abutted part 2211 in the second direction.

A support part 311*b* is provided on the support member 31, and the support part 311*b* is hollow inside. The support part 311*b* includes a guide member 311*b*1, and the guide member 311*b*1 extends approximately in the second direction. The support part 311*b* also includes a cover part 314, and the support part 311*b* is provided with an insertion hole. The cover part 314 is provided with a plurality of first connecting protrusions 3141 extending in the first direction so that the cover part 314 can be detachably mounted on the bottom of the support part 311*b*. The cover part 314 is provided with a through-hole 3142 penetrating the cover part 314 in the third direction.

Figure 15:
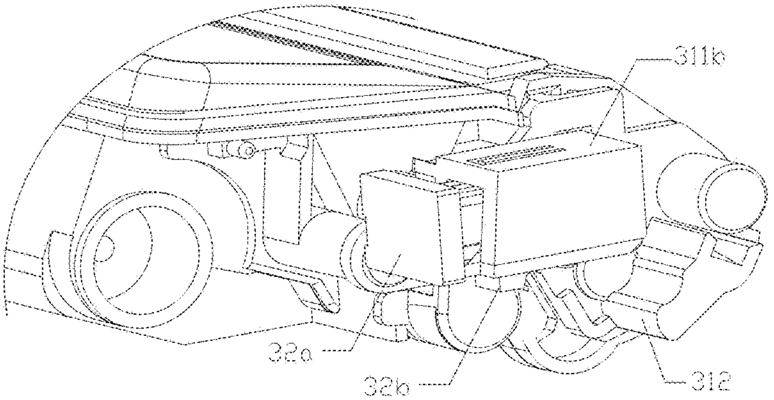
FIG. 15 is a schematic structural diagram of a second side of a developing cartridge in Embodiment 2.
Figure 16:
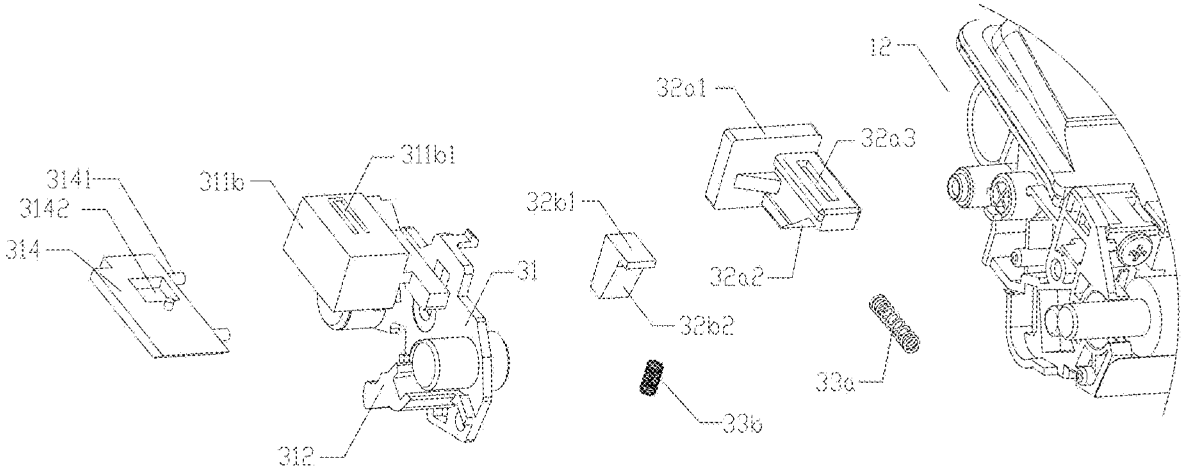
FIG. 16 is an exploded view of a second side in Embodiment 2.
Figure 17:
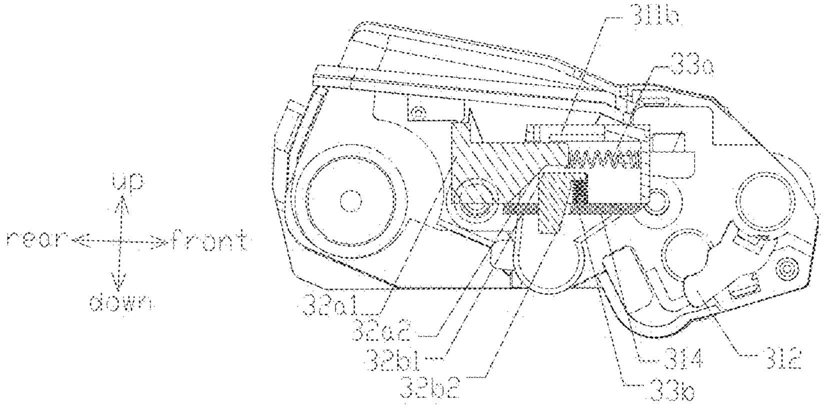
FIG. 17 is a cross-sectional view of a second side in Embodiment 2.
Figure 18:
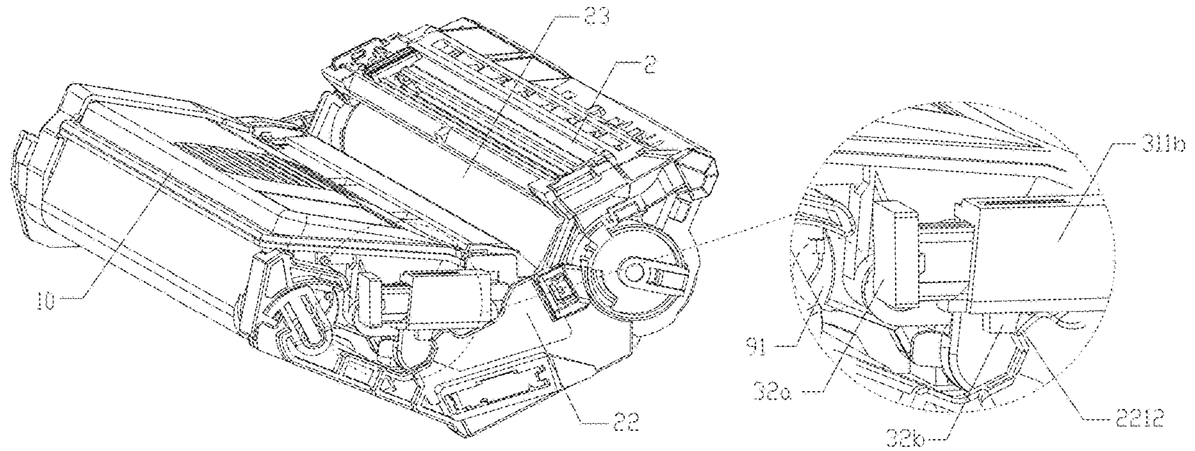
FIG. 18 is a schematic structural diagram of a developing cartridge mounted to a drum cartridge without receiving a separation force in Embodiment 2.
Figure 19:
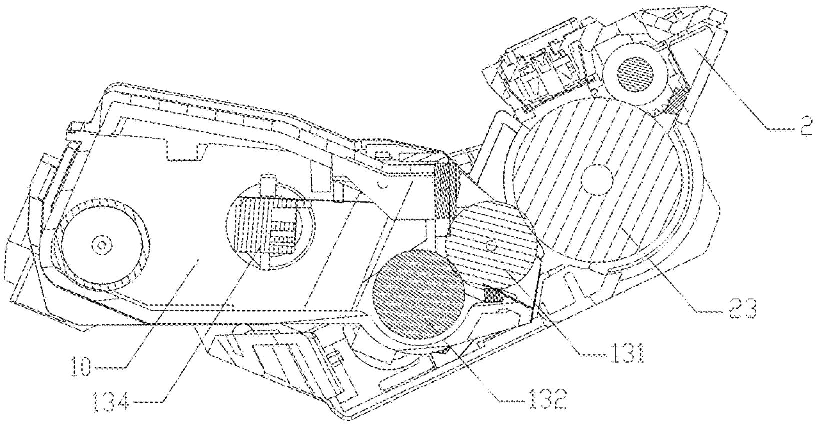
FIG. 19 is a cross-sectional view of a developing cartridge mounted to a drum cartridge without receiving a separation force in Embodiment 2.
Figure 20:
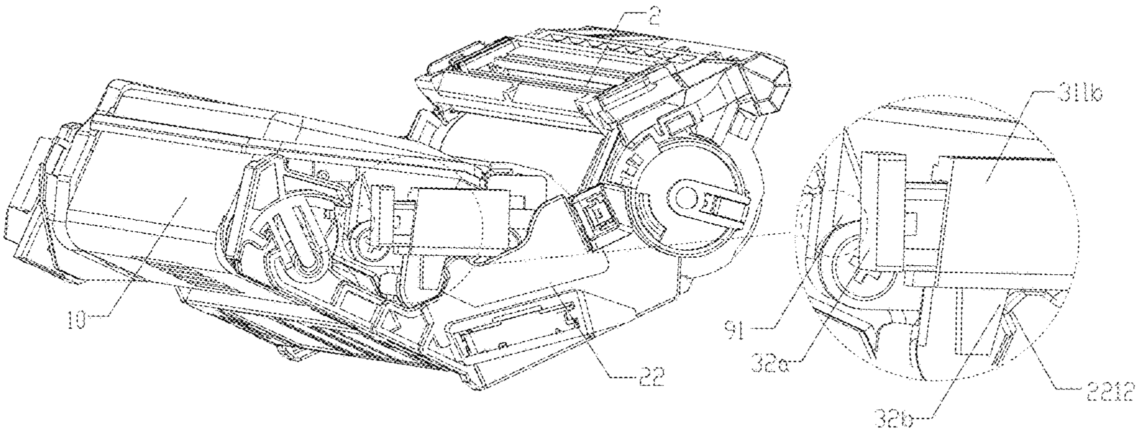
FIG. 20 is a schematic structural diagram of a developing cartridge mounted to a drum cartridge to receive a separation force in Embodiment 2.
Figure 21:
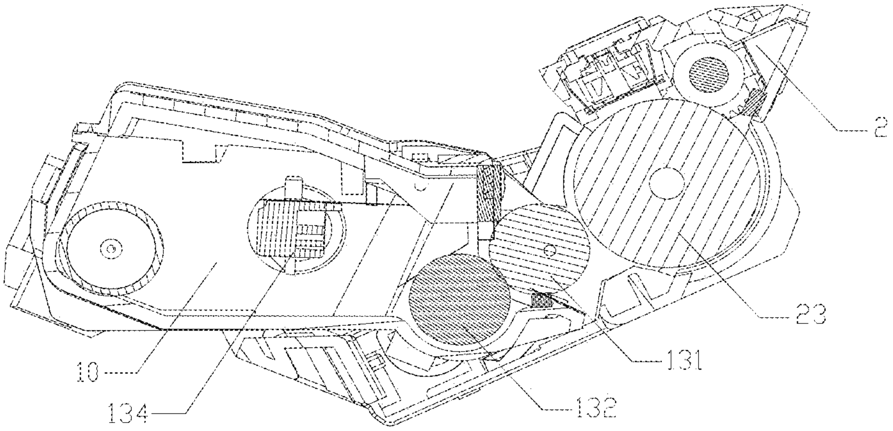
FIG. 21 is a cross-sectional view of a development cartridge mounted to a drum cartridge to receive a separation force in Embodiment 2.

As shown in FIGS. 15 to 17, the separation member includes a force-bearing member 32*a* and a force-applying member 32*b* disposed at the second side 12, and both the force-bearing member 32*a* and the force-applying member 32*b* are movably supported by the support part 311*b*. The force-bearing member 32*a* includes a first force-bearing part 32*a*1, a first force-applying part 32*a*2 and a guided part 32*a*3. The first force-bearing part 32*al* is positioned at the rear end of the force-bearing member 32*a* in the second direction, and the first force-bearing part 32*a*1 is configured to receive the separation force of the separation force output member 91 so that the force-bearing member 32*a* moves in the second direction relative to the casing 10. The first force-applying part 32*a*2 has an inclined surface or an arc surface, and optionally an inclined surface in the disclosed embodiment. The extension direction of the first force-applying part 32*a*2 intersects with the second direction and the third direction, specifically extending backward in the second direction and extending downward in the third direction. The guided part 32*a*3 cooperates with the guide member 311*b*1 so that the force-bearing member 32*a* is guided by the support part 311*b* and moves according to a predetermined trajectory.

As shown in FIGS. 15 to 17, the force-applying member 32*b* includes a second force-bearing part 32*b*1 and a second force-applying part 32*b*2. The second force-bearing part 32*b*1 is abutted by the first force-applying part 32*a*2 to make the force-bearing member 32*a* move in the third direction. The second force-applying part 32*b*2 has an inclined surface or an arc surface, and optionally an inclined surface in the disclosed embodiment. The extension direction of the second force-applying part 32*b*2 intersects the second direction and the third direction, specifically extending backward in the second direction and extending downward in the third direction. The extension directions of the second force-applying part 32*b*2 and the first force-applying part 32*a*2 can be intersecting or parallel, and optionally intersecting in the disclosed embodiment. The second force-applying part 32*b*2 abuts against the second abutted part 2212 on the drum cartridge. The second force-applying part 32*b*2 is exposed to the outside through the through-hole 3142 of the cover part 314. In the disclosed embodiment, the support part 311*b* and the cover part 314 are formed by separate components for the convenience of the force-bearing member 32*a* and the force-applying member 32*b*. In other embodiments, the support part 311*b* and the cover part 314 can be formed in one piece. In some embodiments, the force-bearing member 32*a* and the force-applying member 32*b* can be movably supported by the casing 10.

As shown in FIGS. 15 to 17, the support part 311*b* also contains a reset elastic member for resetting the separation member. In the disclosed embodiment, the reset elastic member includes a first elastic component 33*a* and a second elastic component 33*b*. The first elastic component 33*a* and the second elastic component 33*b* are optionally compression springs, and may also be other elastic media such as sponges or tension springs. The first elastic component 33*a* can be compressed and stretched in the second direction. The first elastic component 33*a* is positioned between the force-bearing member 32*a* and the front end of the support part 311*b* in the second direction. The second elastic component 33*b* can be compressed and stretched in the third direction. The second elastic component 33*b* is positioned between the force-applying member 32*b* and the cover part 314 in the third direction. It is also possible to set only one elastic member or no elastic member.

Figure 14:
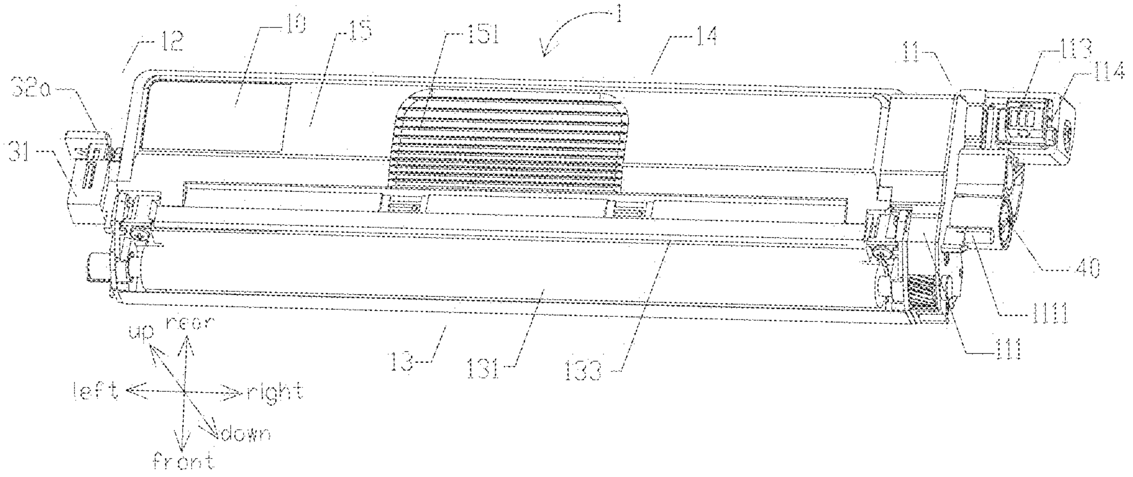
FIG. 14 is a schematic structural diagram of a developing cartridge in Embodiment 2.

As shown in FIG. 14, the first abutting member 1111 in contact with the external component is disposed at the first side 11 of the casing 10. The first abutting member 1111 is optionally disposed on the first protective cover 111. In other embodiments, the first abutting member 1111 may be disposed on the casing 10. In the second direction, the first abutting member 1111 is positioned between the rotation axis of the developing roller 131 and the rotation axis of the coupling 40. The first abutting member 1111 extends in the first direction. The first abutting member 1111 contacts another abutted part on the drum cartridge 2, and the other abutted part is positioned on the second sidewall 22. The contact position of the first abutting member 1111 with the other abutted part is positioned outside the position where the developing roller 131 contacts the photosensitive drum 23.

As shown in FIGS. 18 to 21, when the developing cartridge 1 is mounted to the drum cartridge 2 and the two are mounted together in the image-forming device, the developing roller 131 is in close contact with the photosensitive drum 23. When the image-forming device issues an instruction to disengage the developing roller 131 and the photosensitive drum 23, the separation force output member 91 abuts against the first force-bearing part 32*al* of the force receiving member 32*a* to apply a separation force thereto. Accordingly, the force receiving member 32*a* moves forward in the second direction relative to the casing 10, the first elastic component 33*a* is compressed, and the first force-applying part 32*a*2 abuts against the second force-bearing part 32*b*1 of the force-applying member 32*b* so that the force-applying member 32*b* moves downward in the third direction, and the second elastic component 33*b* is compressed. The second force-applying part 32*b*2 of the force-applying member 32*b* interacts with the second abutted part 2212, so that the force-bearing member 32*a* drives the second side 12 of the casing 10 to overcome the forced thrust to move in a direction away from the photosensitive drum 23. The force-applying member 32*b* and the casing 10 move relative to each other, and the end of the developing roller 131 positioned at the second side 12 gradually breaks away from contact with the photosensitive drum 23.

When the force-applying member 32*b* drives the second side 12 to move in a direction away from the photosensitive drum 23, the first abutting member 1111 interacts with another abutting part. Accordingly, the first side 11 also moves in a direction away from the photosensitive drum 23 so that the end of the developing roller 131 positioned at the first side 11 gradually loses contact with the photosensitive drum 23, and then the developing roller 131 completely loses contact with the photosensitive drum 23. It can be seen that the distance moved by the second side 12 is not less than the distance moved by the first side 11. In the disclosed embodiment, it is preferred that the distance moved by the second side 12 is greater than the distance moved by the first side 11.

In some embodiments, the first abutting member 1111 may not be provided, and only the second force-applying part 32*b*2 is provided to interact with the drum cartridge so that the end of the developing roller 131 positioned at the second side 12 is out of contact with the photosensitive drum 23.

When the developing roller 131 needs to contact the photosensitive drum 23 again, the separation force output member 91 releases the contact with the force-bearing member 32*a*, and the force-bearing member 32*a* and the force-applying member 32*b* move in opposite directions under the elastic action of the first elastic component 33*a* and the second elastic component 33*b* respectively, and the developing cartridge 1 moves toward the direction close to the photosensitive drum 23 under the action of the thrust applied by the drum cartridge 2, and the developing roller 131 contacts the photosensitive drum 23.

In other embodiments, the force-bearing member is a swinging member, which receives the separation force applied by the separation force output member 91 and can swing relative to the casing 10, and drive the casing 10 to move in a direction away from the photosensitive drum 23, so that the developing roller 131 and the photosensitive drum 23 are out of contact.

In addition, in the disclosed embodiment, the agitator 134 includes a rotating shaft and a agitator blade. The rotating shaft rotates along with the agitator gear 46, and the rotating shaft drives the agitator blade to rotate, and the agitator blade stirs the developer.

Embodiment 3

Unless otherwise specified, the structure of the developing cartridge in the Embodiment 3 is the same as that in Embodiment 1. The main difference between Embodiment 3 and Embodiment 1 is that the separation member 32 in Embodiment 3 cannot move relative to the casing 10.

Figure 22:
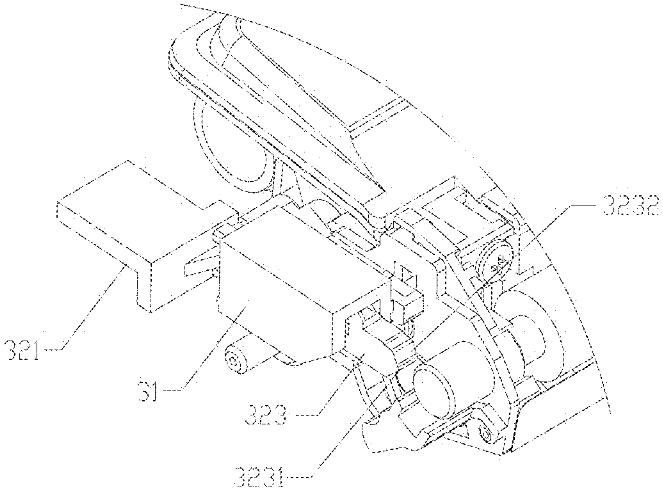
FIG. 22 is a schematic structural diagram of a second side in Embodiment 3.
Figure 23:
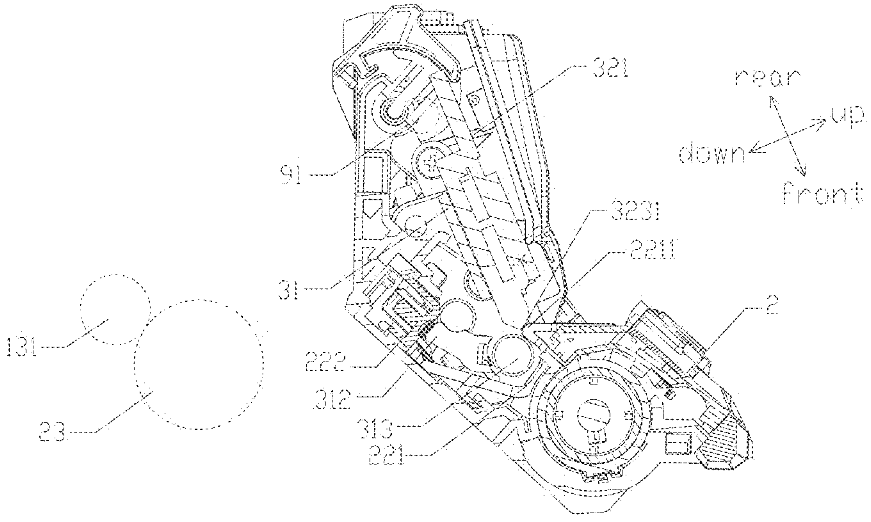
FIG. 23 is a cross-sectional view of a developing cartridge mounted to a drum cartridge without receiving a separation force in Embodiment 3.
Figure 24:
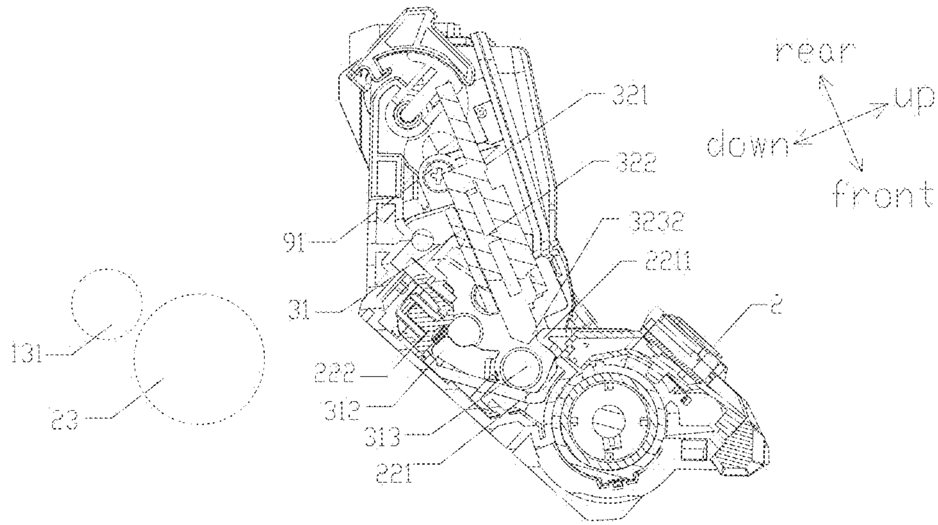
FIG. 24 is a cross-sectional view of a developing cartridge mounted to a drum cartridge to receive a separation force in Embodiment 3.

As shown in FIGS. 22 to 24, in the disclosed embodiment, the separation member 32 is supported by the support member 31, and can be fixedly mounted on the support member 31, or formed integrally with the support member 31, or directly mounted on the casing 10, that is, the separation member 32 does not move relative to the casing 10. The force-applying part 323 is stepped, and the force-applying part 323 includes a third force-applying part 3231 and a fourth force-applying part 3232. The third force-applying part 3231 is farther away from the force-bearing part 321 than the fourth force-applying part 3232, and the two are connected by an inclined surface or an arc surface.

The developing cartridge 1 is mounted on the drum cartridge 2, and the two are mounted together in the image-forming device. When the developing cartridge 1 does not receive the separation force, the third force-applying part 3231 contacts the first abutted part 2211 but does not generate a squeezing movement, or does not contact the first abutted part 2211, and the developing roller 131 contacts the photosensitive drum 23. When the separation force output member 91 abuts against the force-bearing part 321 and applies separation force thereto, the separation member 32 transmits the separation force to the casing 10 and drives the casing 10 to move. As the separation force output member 91 continues to apply the separation force, the fourth force-applying part 3232 abuts against the first abutted part 2211, the second side 12 moves in a direction away from the photosensitive drum 23, and a part of the developing roller 131 is out of contact with the photosensitive drum. When the second guided part 313 abuts against the second guide opening 221, the holder 114 is subjected to the force so that the first side 11 moves in a direction away from the photosensitive drum 23, and the other part of the developing roller 131 is out of contact with the photosensitive drum 23.

Optionally, the force-applying part 323 may be in an arc or inclined shape instead of a step shape, and the arc or inclined surface has a greater curvature or inclination.

Compared with Embodiment 1, this embodiment can simplify the structure of the developing cartridge, and facilitate the production of the developing cartridge 1.

Embodiment 4

Unless otherwise specified, the structure of the developing cartridge in Embodiment 4 is the same as that in Embodiment 3. The main difference between Embodiment 4 and Embodiment 3 is that the separation member 32 in Embodiment 4 cannot move relative to the casing 10.

Figure 25:
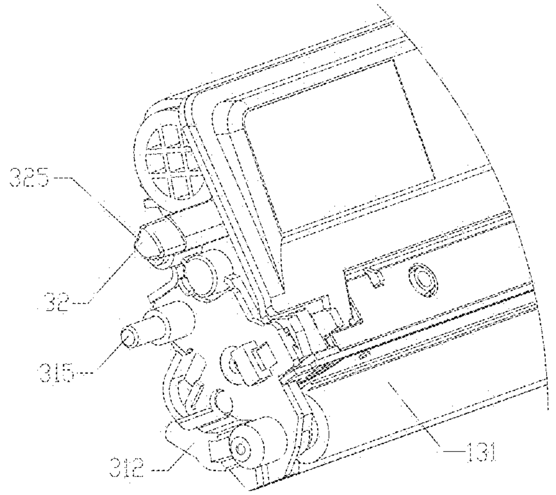
FIG. 25 is a schematic diagram of the three-dimensional structure of a developing cartridge in Embodiment 4.
Figure 26:
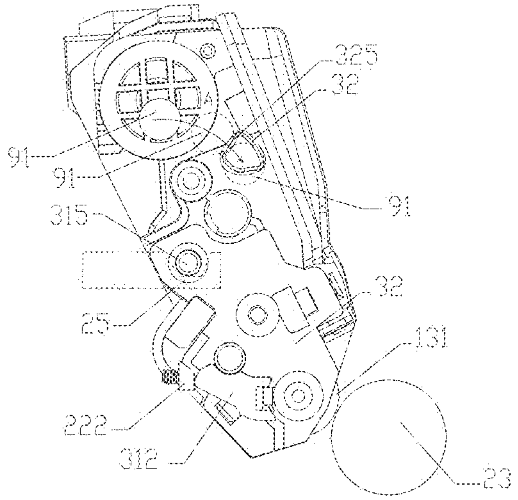
FIG. 26 is a side view of a developing cartridge when a developing roller is in contact with a photosensitive drum in Embodiment 4.

As shown in FIGS. 25 and 26, a separation member 32 is provided on the second side 12 of the casing 10. The separation member 32 is fixedly provided at the second side 12. In the disclosed embodiment, the separation member 32 is fixedly provided at the second side 12 by an integral molding method. In other embodiments, the separation member 32 can also be separated from the casing 10 and fixedly disposed at the second side 12 by means of screw buckles or the like. The separation member 32 is a protrusion structure protruding leftward in the first direction. The separation member 32 is provided near the fourth side 14 in the second direction.

The separation member 32 is provided with a separation force receiving surface 325, which is an arc-shaped concave surface, and the arc-shaped concave surface includes one or more common arc surfaces, or stepped inclined surfaces, etc. The second direction and the third direction both intersect the separation force receiving surface 325. The separation force receiving surface 325 is configured to contact the separation force output member 91 in the image-forming device and bear the separation force applied by the separation force output member 91.

A support column 315 is also integrally formed or detachably fixedly provided on the second side 12. The support column 315 protrudes to the left from the second side 12 in the first direction. In the second direction, the support column 315 is positioned between the rotation axis of the agitator and the rotation axis of the coupling 40. The support column 315 is configured to cooperate with the positioning part on the drum cartridge 2. The positioning part is optionally positioned in the positioning slot 25 of the second sidewall 22. When the developing cartridge 1 is mounted on the drum cartridge 2 and mounted in the image-forming device together with the drum cartridge 2, the gravity of the developing cartridge is borne by the positioning slot 25 through the cooperation between the positioning slot 25 and the support column 315. The separation member 32 is higher than the support column 315 in the third direction, and the separation member 32 is further back than the support column 315 in the second direction (further from the developing roller 131).

In the disclosed embodiment, when the separation force output member 91 in the image-forming device rotates clockwise (direction A in FIG. 26), the separation member 32 is positioned on the movement path of the separation force output member 91, so that the separation force output member 91 contacts the separation member 32, and the separation member 32 is subjected to the separation force in the clockwise direction applied by the separation force output member 91. Accordingly, the separation member 32 drives the developing cartridge 1 to rotate clockwise by a certain angle with the support column 315 as the rotation axis to overcome the forced thrust applied by the force-applying component, and the developing cartridge 1 moves in a direction away from the photosensitive drum 23, thereby separating the developing roller 131 from the photosensitive drum 23. The developing roller 131 and the photosensitive drum 23 may be completely separated or partially separated. That is, in the disclosed embodiment, the support column 315 can be considered as a first abutting member.

When the separation force output member 91 in the image-forming device rotates counterclockwise or is no longer driven by the driving force provided by the image-forming device, the developing cartridge 1 rotates counterclockwise about the support column 315 by a certain angle under the action of the pushing force provided by the force-applying component, so that the developing roller 131 contacts the photosensitive drum 23 again.

Figure 27:
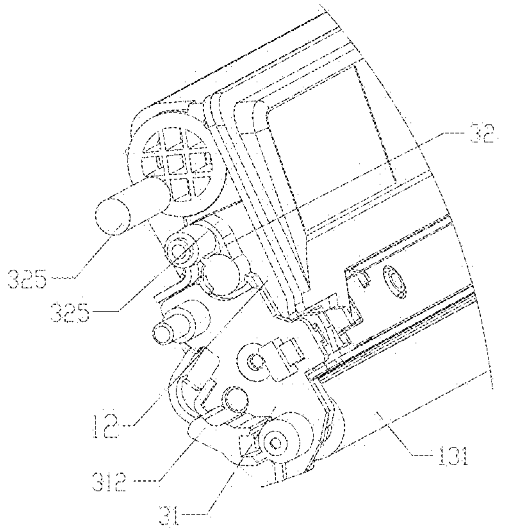
FIG. 27 is a schematic structural diagram of another embodiment of a developing cartridge in Embodiment 4.
Figure 28:
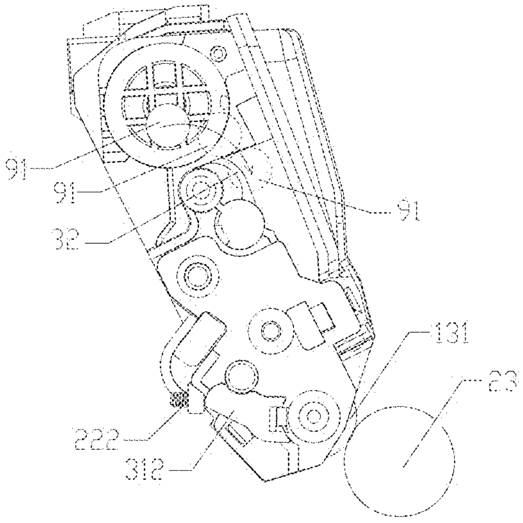
FIG. 28 is a side view of another embodiment of a developing roller in contact with a photosensitive drum in Embodiment 4.

In one embodiment, as shown in FIGS. 27 and 28, the separation member 32 is in the shape of an arc-shaped rib protruding to the left in the first direction, and the separation force receiving surface 325 is in the shape of an arc. And the separation force receiving surface 325 is inscribed in the moving path of the separation force output member 91 in the image-forming device, so that when the separation force output member 91 rotates clockwise in the moving path (direction C in FIG. 28), the separation force output member 91 abuts against the separation force receiving surface 325 on the separation member 32 to receive the separation force. Accordingly, the second side 12 overcomes the forced thrust and moves. At the same time, the front end of the first guided part 122 of the first side 11 abuts against the drum cartridge 2 to form a fulcrum, so that the second side 12 rotates a certain angle about the fulcrum formed between the front end of the first guided part 122 and the drum cartridge 2, thereby separating the developing roller 131 from the photosensitive drum 23.

Embodiment 5

Unless otherwise specified, the structure of the developing cartridge in Embodiment 5 is the same as that in Embodiment 3. The main difference between Embodiment 5 and Embodiment 3 is that the structures of the separation member 32 and the second guided part 313 are different.

Figure 29:
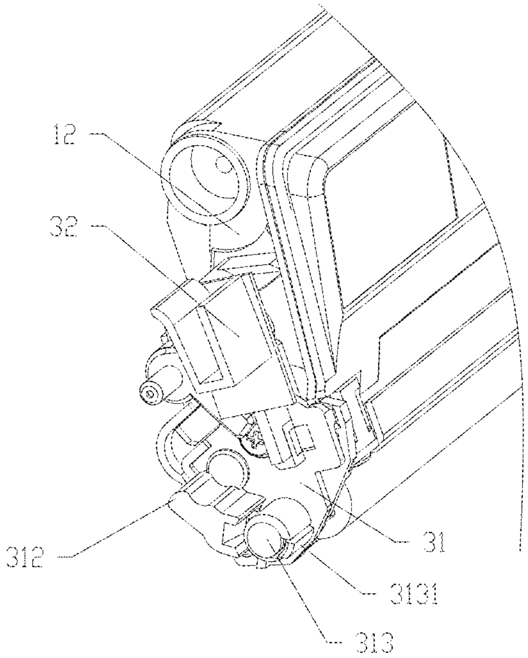
FIG. 29 is a schematic structural diagram of a second side of a casing in Embodiment 5.
Figure 30:
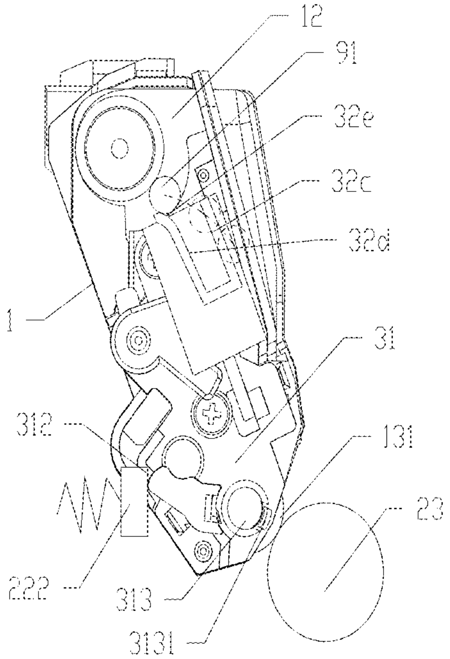
FIG. 30 is a side view of a developing cartridge in which a developing roller and a photosensitive drum are in contact with each other in Embodiment 5.

As shown in FIGS. 29 and 30, in the disclosed embodiment, the second guided part 313 includes a guide body and an elastic part 3131, the second abutting surface is arranged on the elastic part 3131. The elastic part 3131 protrudes in the radial direction relative to the guide body, the elastic part 3131 is positioned at the front end of the second guided part 313, and the elastic part 3131 and the guide body are separated from each other in the second direction. That is, the elastic part 3131 and the guide body are not in contact. The guide body is positioned at the rear side of the elastic part 3131. The guide body is configured to contact and abut with the first guide surface 221*a* and the second guide surface 221*b* of the second guide opening 221. The elastic part 3131 is configured to contact and abut with the abutted surface 221*c*. That is, the elastic part 3131 is a first abutting member in the disclosed embodiment.

Figure 31:
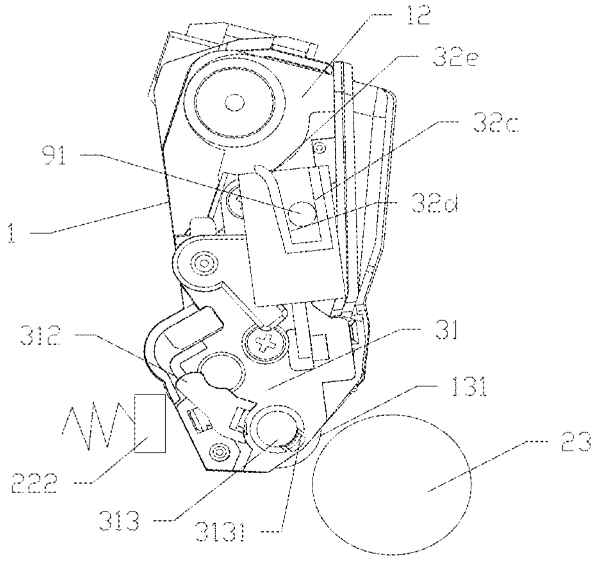
FIG. 31 is a side view of a developing cartridge in which a developing roller and a photosensitive drum are in a separated state in Embodiment 5.

As shown in FIGS. 29 to 31, the separation member 32 is fixedly arranged at the second side 12 of the casing 10. Specifically, the separation member 32 is integrally formed with the support member 31 or is separately assembled to the second side 12. The separation member 32 includes a separation guide rail, which extends to the left in the first direction and protrudes from the second side 12 of the casing 10. The separation guide rail includes a first force receiving surface 32*c* and a second force receiving surface 32*d* extending in the front-back direction. The first force receiving surface 32*c* and the second force receiving surface 32*d* are arranged relatively in the up-down direction and have a gap, and the first force receiving surface 32*c* is positioned on the upper side of the second force receiving surface 32*d*. The third direction intersects with the first force receiving surface 32*c* and the second force receiving surface 32*d*. The upper end of the second force receiving surface 32*d* is also provided with a third guide surface 32*e*, which is in an arc shape. The lower end of the third guide surface 32*e* is connected to the second force receiving surface 32*d*, and the upper end of the third guide surface 32*e* is more forward than the lower end of the third guide surface 32*e*.

As shown in FIGS. 29 to 31, when it is necessary to separate the developing roller 131 from the photosensitive drum 23, the image-forming device issues an instruction to run the separation force output member 91 in the image-forming device, and the separation force output member 91 moves clockwise along a circular arc trajectory (viewed from left to right). The separation force output member 91 can enter the separation guide rail along the third guide surface 32*e*, and contact the first force receiving surface 32*c* to apply a force to the first force receiving surface 32*c*, so that the first force receiving surface 32*c* drives the developing cartridge 1 to rotate clockwise around the line connecting the first guided part 122 and the second guided part 313 by a certain angle. Then the first forced pushing part 1221 and the second forced pushing part 312 also rotate clockwise around the line connecting the first guided part 122 and the second guided part 313 by a certain angle, so that the first forced pushing part 1221 and the second forced pushing part 312 are respectively disengaged from the first force-applying member 212 and the second force-applying member 222 to stop receiving the pushing force. When the first forced pushing part 1221 and the second forced pushing part 312 receive the pushing force, the pushing force will cause the developing cartridge to tend to move toward the photosensitive drum 23, so that the elastic part 3131 on the second guided part 313 is compressed and bent to produce elastic deformation when the elastic part 3131 contacts the abutted surface 221*c*. That is, the elastic force of the elastic part 3131 is smaller than the pushing force and therefore cannot overcome the pushing force and recover elastically. When the first forced pushing part 1221 and the second forced pushing part 312 respectively lose contact with the first force-applying member 212 and the second force-applying member 222 and stop receiving the pushing force, the elastic part 3131 recovers elastically, so that the elastic part 3131 applies an elastic force to the abutted surface 221*c*. The elastic part 3131 is subjected to a reaction force exerted by the abutted surface 221*c* in the direction away from the photosensitive drum 23, thereby causing the second side 12 of the casing 10 to swing a certain angle in the direction away from the photosensitive drum 23 with the contact point between the first guided part 122 and the abutted surface 221*c* of the first guide opening 211 as a fulcrum. This causes the casing 10 to drive the left end of the developing roller 131 to move in the direction away from the photosensitive drum 23, causing the developing roller 131 to move from a state parallel to the photosensitive drum 23 to a state inclined relative to the photosensitive drum 23, thereby causing the developing roller 131 to lose contact with the photosensitive drum 23.

When it is necessary to make the developing roller 131 contact the photosensitive drum 23 again, the image-forming device issues an instruction to run the separation force output member 91 in the image-forming device, and the separation force output member 91 moves counterclockwise along the arc trajectory. The separation force output member 91 contacts the second force receiving surface 32*d*, thereby applying a force to the second force receiving surface 32*d*, so that the developing cartridge 1 rotates counterclockwise around the line connecting the first guided part 122 and the second guided part 313 by a certain angle. This then makes the first forced pushing part 1221 and the second forced pushing part 312 rotate counterclockwise by a certain angle around the line connecting the first guided part 122 and the second guided part 313. Accordingly, the first forced pushing part 1221 and the second forced pushing part 312 are again in contact with the first force-applying member 212 and the second force-applying member 222 to receive the pushing force. The developing cartridge and the developing roller 131 thus move under the action of the pushing force and overcome the elastic force of the elastic part 3131, so that the elastic part 3131 produces elastic deformation and the developing roller 131 is in close contact with the photosensitive drum 23 again.

In other embodiments, the elastic part 3131 may also be provided on the first guided part 122, so that when the first forced pushing part 1221 and the second forced pushing part 312 do not receive the pushing force, the elastic part 3131 at the right end of the casing 10 applies an elastic force to the abutted surface 221*c* of the first guide opening 211. Accordingly, the first side 11 of the casing 10 moves away from the photosensitive drum 23 under the elastic force of the elastic part 3131. The right end of the developing roller 131 thus moves away from the photosensitive drum 23, so that the developing roller 131 moves from a state parallel to the photosensitive drum 23 to a state inclined relative to the photosensitive drum 23, thereby causing the developing roller 131 to break contact with the photosensitive drum 23.

In other embodiments, the elastic part 3131 can also be simultaneously provided on the first guided part 122 and the second guided part 313, so that the elastic parts 3131 at both ends of the casing 10 apply an elastic force to the abutted surface 221*c* of the first guide opening 211 and the abutted surface 221*c* of the second guide opening 221 respectively. Accordingly, the first side 11 and the second side 12 of the casing 10 move simultaneously in the direction away from the photosensitive drum 23 under the elastic force of the elastic part 3131. Therefore, both ends of the developing roller 131 move simultaneously in the direction away from the photosensitive drum 23, so that the separation of the developing roller 131 and the photosensitive drum 23 is more thorough.

Embodiment 6

Unless otherwise specified, the structure of the developing cartridge in Embodiment 6 is the same as that in Embodiment 1. The main difference between Embodiment 6 and Embodiment 1 is that the separation member is arranged at the first side 11 in Embodiment 6.

Figure 32:
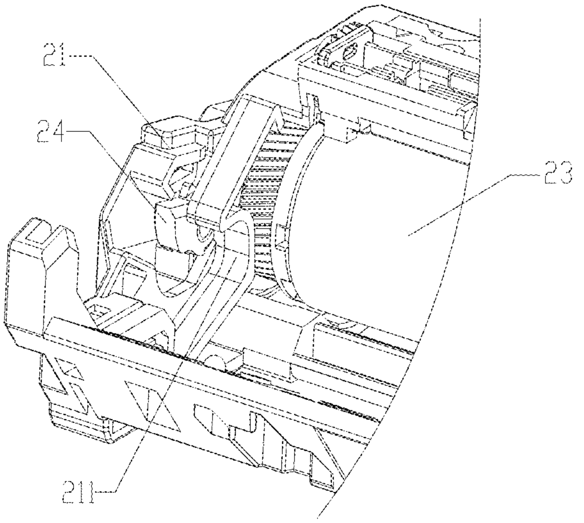
FIG. 32 is a schematic structural diagram of a drum cartridge in Embodiment 6.

As shown in FIG. 32, a separation lever 24 is also provided on the drum cartridge 2. The separation lever 24 can move relative to the drum cartridge 2. The separation lever 24 is provided at the first sidewall 21. The separation lever 24 receives an instruction output by the image-forming device and applies a separation force to the developing cartridge 1.

As shown in FIGS. 31-35, the separation member 32 is arranged at the first side 11. The separation member 32 is a protrusion protruding to the right in the first direction. In the disclosed embodiment, the separation member 32 is optionally formed integrally with the first guided part 122, or it can be separate units that are combined. The separation member 32 can receive the separation force applied by the separation lever 24.

The first abutting member 34 in contact with the external component is arranged at the second side 12. The first abutting member 34 is optionally formed integrally with the second guided part 313, or may be separate units that are combined. The first abutting member 34 radially protrudes relative to the second guided part 313 and extends in the first direction. The first abutting member 34 at least partially overlaps with the developing roller 131. When the developing cartridge 1 is fully mounted on the drum cartridge 2, the first abutting member 34 contacts the first abutted part 2211, and the contact position is the first position. The first abutting member 34 is optionally an arc-shaped recessed part, which can prevent the first abutting member 34 from interfering with the first abutted part 2211 when the developing cartridge 1 is mounted on the drum cartridge 2, and can also make the first abutting member 34 stably contact the first abutted part 2211. In other embodiments, the first abutting member 34 may be a protrusion of other shapes. The position where one end of the developing roller 131 positioned at the second side 12 contacts the photosensitive drum 23 is the second position, and the first position is positioned outside the second position. Further, in the first direction, the first position is farther away from the first side 11 than the second position, that is, the contact position between the first abutting member 34 and the first abutted part 2211 is positioned outside the contact position between the developing roller 131 and the photosensitive drum 23. In one embodiment, the first abutting member 34 can be farther away from the developing roller 131 and positioned at the second side 12.

Figure 33:
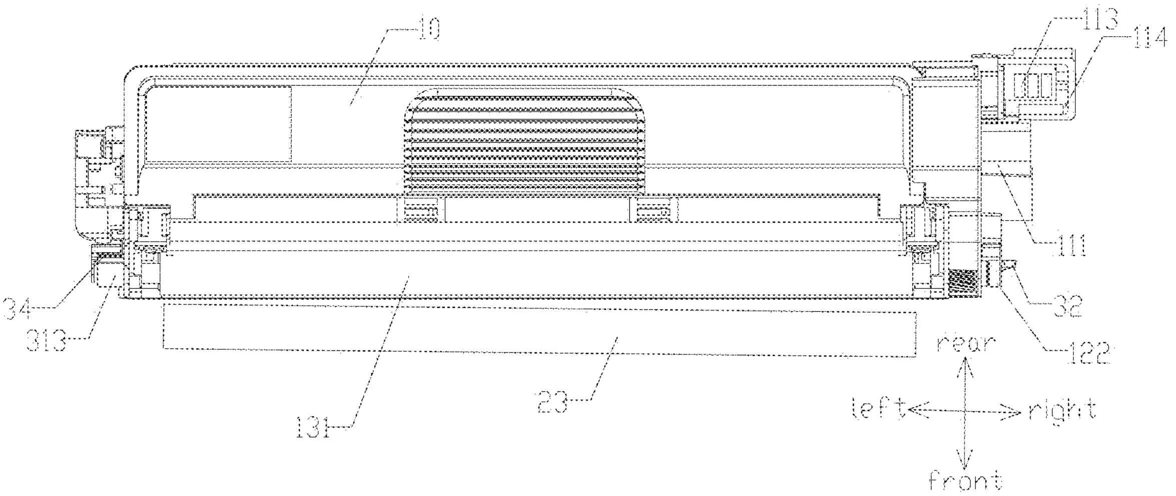
FIG. 33 is a schematic structural diagram of a developing cartridge away from a photosensitive drum in Embodiment 6.
Figure 34:
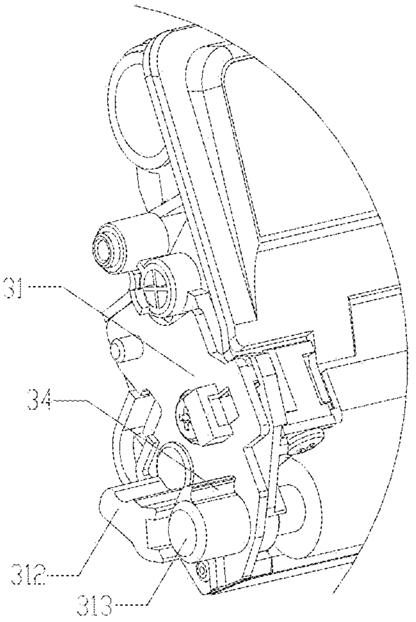
FIG. 34 is a schematic structural diagram of a second side of a developing cartridge in Embodiment 6.
Figure 35:
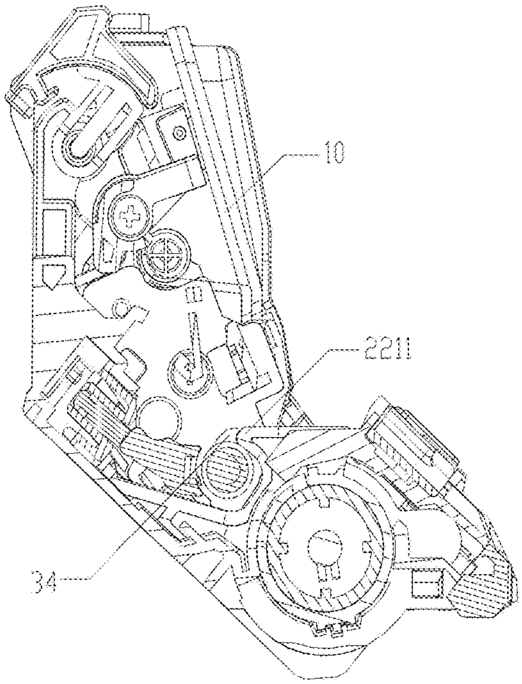
FIG. 35 is a cross-sectional view of a developing cartridge mounted to a drum cartridge in Embodiment 6.
Figure 36:
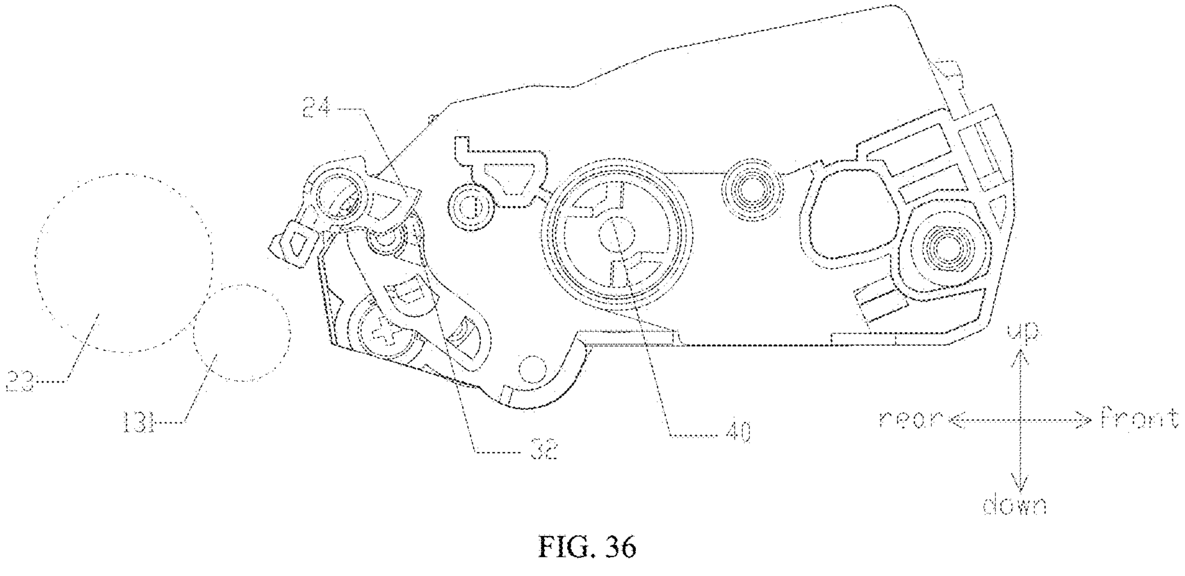
FIG. 36 is a schematic structural diagram of a separation member when the separation member does not receive a separation force in Embodiment 6.
Figure 37:
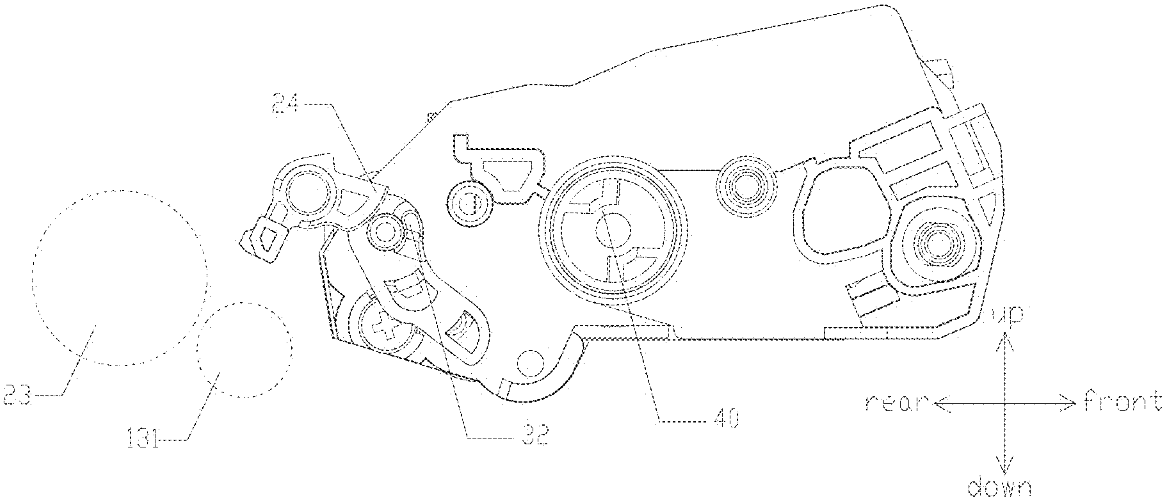
FIG. 37 is a schematic structural diagram of a separation member receiving a separation force in Embodiment 6.

As shown in FIGS. 33, 36, and 37, when the separation lever 24 does not receive the separation instruction of the image-forming device, the separation lever 24 does not apply the separation force to the separation member 32, and the developing roller 131 contacts the photosensitive drum 23. When the separation lever 24 receives the separation instruction, the separation lever 24 abuts against the separation member 32 to apply the separation force thereto, and the separation member 32 transmits the separation force to the casing 10, so that the casing 10 moves in the direction away from the photosensitive drum 23, and further the first side 11 moves in the direction away from the photosensitive drum 23. Because the first position is outside the contact position (second position) of the developing roller 131 with the photosensitive drum 23, the casing 10 can be made to swing in the direction away from the photosensitive drum 23 with the first side 11 receiving the separation force with the first position as the fulcrum. The casing 10 overcomes the forced thrust force applied by the force-applying assembly, thereby separating the developing roller 131 from the photosensitive drum 23. It is also possible that after the separation member 32 receives the separation force, the first abutting member 34 contacts the first abutted part 2211.

It can be seen that the distance generated by the movement of the second side 12 of the casing 10 is smaller than the second distance generated by the movement of the first side 11, that is, in the first direction from left to right, the gap between the developing roller 131 and the photosensitive drum 23 gradually increases. In other words, the gap between the end of the developing roller 131 at the second side 12 and the photosensitive drum 23 is smaller than the gap between the other end (at the first side 11) and the photosensitive drum 23.

In other embodiments, the first abutting member 34 may not be provided, and the position where the peripheral surface of the second guided part 313 abuts against the abutted surface 221*c* of the second guide opening 221 is used as a fulcrum. The disclosed embodiment does not limit the specific position of the first abutting member 34, and the first abutting member 34 may abut against the drum cartridge 2 when the developing cartridge 1 receives the separation force.

Figure 38:
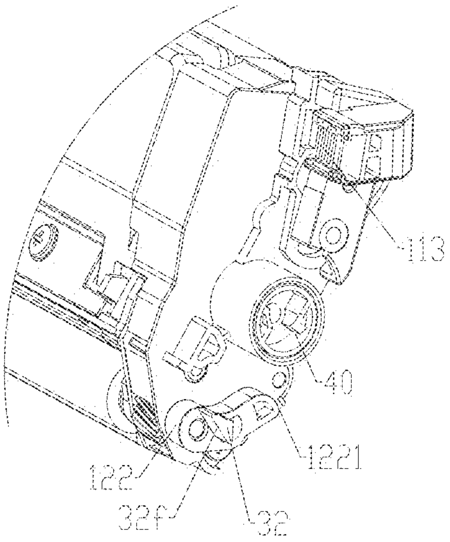
FIG. 38 is a schematic structural diagram of a developing cartridge according to another embodiment in Embodiment 6.

In other embodiments, as shown in FIG. 38, a separation slope 32*f* is further provided on the separation member 32, the front end of the separation slope 32*f* is tilted upwards compared to the rear end, and the first direction, the second direction and the third direction intersect with the separation slope 32*f*. When the separation lever 24 moves, the separation lever 24 abuts against the separation slope 32*f*, thereby sliding on the separation slope 32*f*, so that the separation lever 24 applies a force perpendicular to the separation slope 32*f* to the separation slope 32*f*. Since the second direction and the third direction intersect with the separation slope 32*f*, this force has a component force in the second direction and the third direction, so that the separation member 32 is subjected to a backward and upward force and drives the first side 11 of the casing 10 to swing around the first position (the contact position of the first abutting member 34 and the first abutted part 2211), thereby realizing the separation of the developing roller 131 and the photosensitive drum 23.

When the image-forming device stops providing driving-force to the separation lever 24, the first side 11 of the casing 10 falls down under the effect of the weight of the developing cartridge itself, so that the developing roller 131 and the photosensitive drum 23 are restored to a contact state.

Embodiment 7

The main difference between Embodiment 7 and Embodiment 6 is that the first abutting member 34*b* in Embodiment 7 is farther away from the developing roller 131 than that in Embodiment 6.

Figure 40:
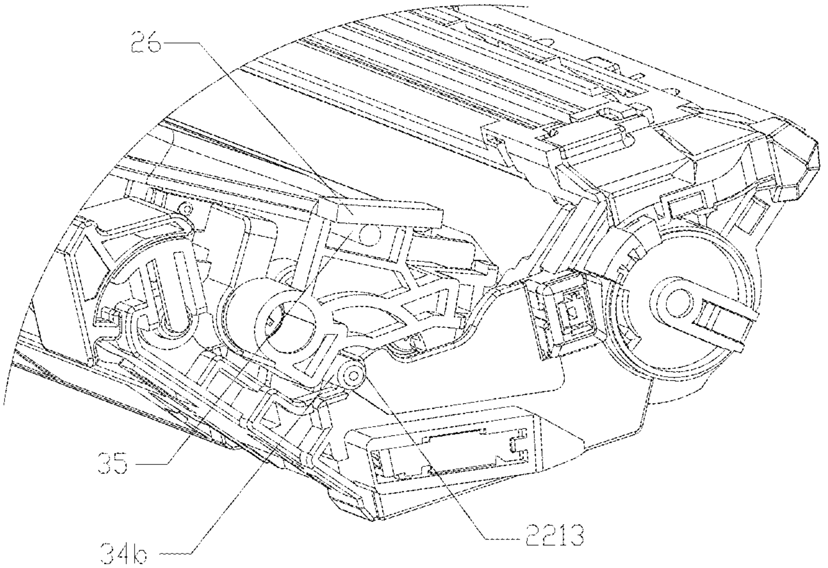
FIG. 40 is a schematic structural diagram of a second side of a developing cartridge and a second sidewall of a drum cartridge in Embodiment 7.

As shown in FIG. 40, the drum cartridge 2 is provided with a third abutted part 2213, which is further away from the photosensitive drum 23 than the first abutted part 2211. The third abutted part 2213 is an arc-shaped opening facing away from the photosensitive drum 23.

Figure 39:
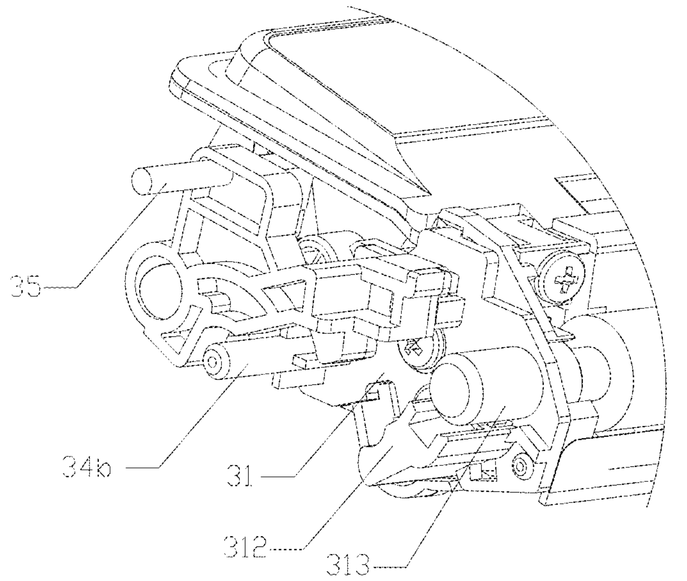
FIG. 39 is a schematic structural diagram of a second side of a developing cartridge in Embodiment 7.

As shown in FIGS. 39 and 40, a first abutting member 34*b* is provided at the second side 12. The first abutting member 34*b* is a protrusion extending in the first direction. In the disclosed embodiment, the first abutting member 34*b* is optionally a cylindrical protrusion. In the second direction, the first abutting member 34*b* is positioned between the developer-filling port 123 and the second guided part 312. When the developing cartridge 1 is mounted on the drum cartridge 2, the third abutted part 2213 contacts the first abutting member 34*b*, and the contact position is the first position. The position where one end of the developing roller 131 positioned at the second side 12 contacts the photosensitive drum 23 is the second position. The first position is positioned outside the second position. Further, in the first direction, the first position is farther away from the first side 11 than the second position, that is, the contact position of the first abutting member 34*b* and the drum cartridge 2 is positioned outside the contact position of the developing roller 131 and the photosensitive drum 23.

When the separation member 32 receives the separation force applied by the separation lever 24, the casing 10 swings with the first position as a fulcrum, so that the developing cartridge 1 swings in a direction away from the photosensitive drum 23, thereby separating the developing roller 131 from the photosensitive drum 23.

Further, as shown in FIGS. 39 and 40, the developing cartridge 1 is also provided with a second abutting member 35 positioned at the second side 12. The second abutting member 35 is a protrusion extending in the first direction. In the disclosed embodiment, the second abutting member 35 is optionally a cylindrical protrusion. In the third direction, the second abutting member 35 is positioned above the first abutting member 34*b*. A fourth abutted part 26 abutting against the second abutting member 35 is provided in the image-forming device. The fourth abutted part 26 is optionally a guide rail in the image-forming device. The fourth abutted part 26 is positioned above the second abutting member 35, that is, the second abutting member 35 abuts against another external component. Since the third abutted part 2213 is an arc-shaped opening, when the casing 10 swings with the first position as a fulcrum, the fourth abutted part 26 abuts against the second abutting member 35 to prevent the third abutted part 2213 from being out of contact with the first abutting member 34*b*, so as to ensure that the casing 10 can stably swing in a direction away from the photosensitive drum 23 with the first position as a fulcrum. The second abutting member 35 can make the swing of the developing cartridge 1 more stable. In some embodiments, the developing cartridge 1 can swing in the first position without the second abutting member 35. In other embodiments, the second abutting member 35 is not provided, and an anti-separation structure such as a buckle is provided at the first abutting member 34*b*, so that the first abutting member 34*b* is in stable contact with the third abutted part 2213.

Embodiment 8

Unless otherwise specified, the structure of the developing cartridge in Embodiment 8 is the same as that in Embodiment 1. The main difference between Embodiment 8 and Embodiment 1 is that no force-applying part 323 is provided at the lower end of the separation member 32, and a flexible member 54, such as a steel wire rope, a nylon rope, etc., is fixedly connected to the lower end of the separation member 32.

Figure 41:
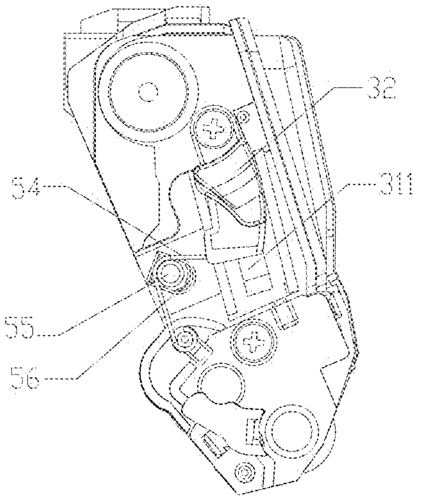
FIG. 41 is a side view of a second side of a casing in Embodiment 8.
Figure 42:
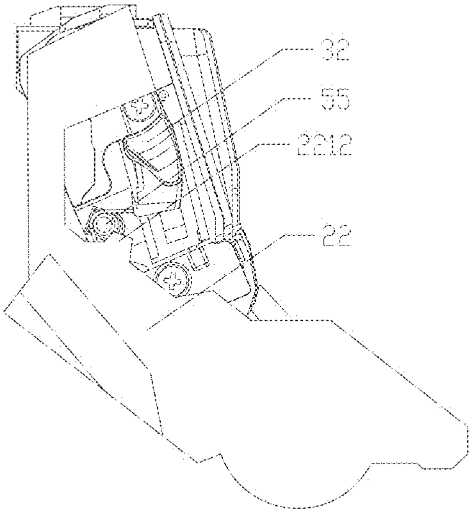
FIG. 42 is a side view of a developing cartridge when mounted to a drum cartridge in Embodiment 8.
Figure 43:
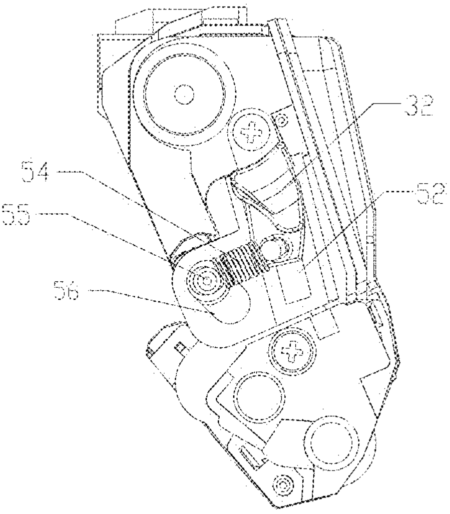
FIG. 43 is a side view of a developing cartridge according to another embodiment in Embodiment 8.
Figure 44:
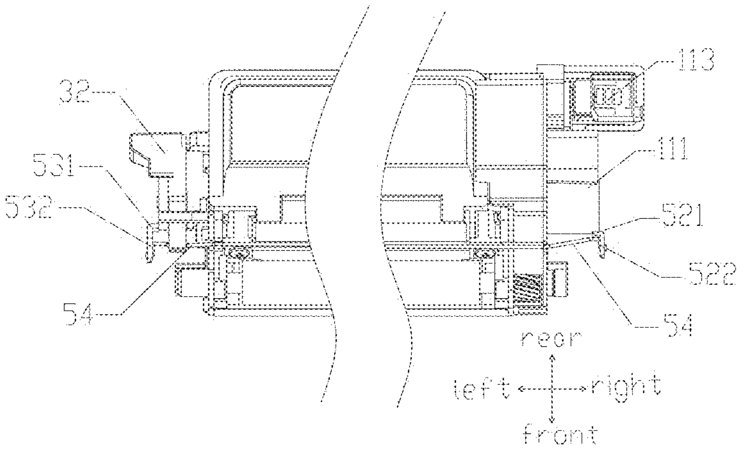
FIG. 44 is a schematic structural diagram of a developing cartridge in Embodiment 9.
Figure 45:
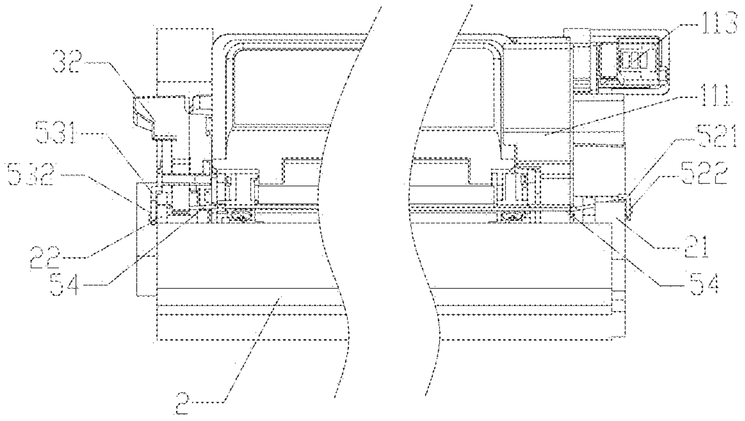
FIG. 45 is a schematic structural diagram of a developing cartridge when mounted to a drum cartridge in Embodiment 9.
Figure 46:
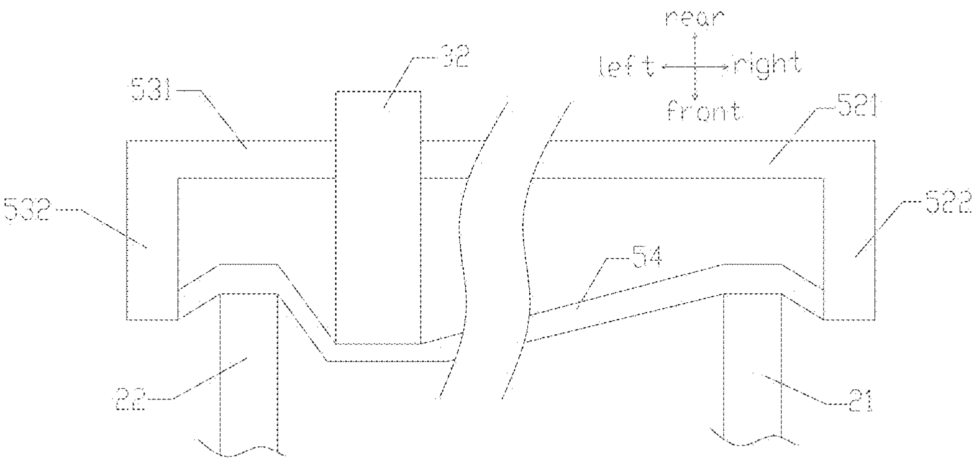
FIG. 46 is a schematic structural diagram of a separation member when a separation force is not received in Embodiment 9.
Figure 47:
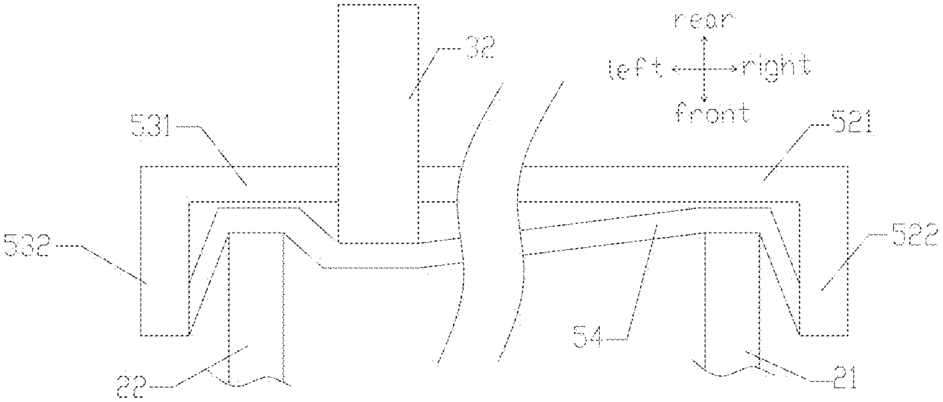
FIG. 47 is a schematic structural diagram of a separation member after receiving a separation force in Embodiment 9.

As shown in FIGS. 41 to 43, the separation member 32 is slidably arranged on the support part 311, and the support part 311 is a first slide rail arranged on the support member 31. The second side 12 of the casing 10 is also fixedly provided with a second slide rail 56. The second slide rail 56 is integrally formed and fixedly arranged on the support member 31. The extension direction of the second slide rail 56 intersects with the second direction and the third direction at the same time. A separation slider 55 is slidably mounted in the second slide rail 56. The separation slider 55 can be displaced in the second direction and the third direction along the second slide rail 56 relative to the casing 10. The separation slider 55 extends to the left in the first direction and extends to the left from the second slide rail 56, and the part of the separation slider 55 extending out of the second slide rail 56 is cylindrical.

The second sidewall 22 of the drum cartridge 2 is provided with a second abutted part 2212 protruding upward. When the developing cartridge is mounted on the drum cartridge 2, the second abutted part 2212 is positioned on the moving path of the separation slider 55.

One end of the flexible member 54 is fixedly connected to the separation member 32, and the other end is fixedly connected to the second side 12 of the casing 10. The separation slider 55 is positioned between the two ends of the flexible member 54, and the flexible member 54 abuts against the separation slider 55 to form a bend.

When the developing roller 131 needs to be out of contact with the photosensitive drum 23, the image-forming device applies a separation force to the separation member 32, so that the separation member 32 slides downward along the support part 311. During the downward sliding process of the separation member 32, the flexible member 54 is pulled, and the flexible member 54 drives the separation slider 55 to move along the second slide rail 56, so that the separation slider 55 moves downward relative to the casing 10 in the second direction and moves forward relative to the casing 10 in the third direction. At the same time, during the movement of the separation slider 55, it contacts the second abutted part 2212 and receives a substantially upward reaction force provided by the second abutted part 2212. At the same time, the separation slider 55 has a distance from the first guided part 122 and the second guided part 313 in the front-to-back direction. That is, the reaction force acts on the position of the casing 10 that deviates from the line connecting the first guided part 122 and the second guided part 313, so that the casing 10 can rotate clockwise around the line connecting the first guided part 122 and the second guided part 313 by a certain angle, thereby realizing the separation of the developing roller 131 from the photosensitive drum 23.

In other embodiments, the flexible member 54 may be fixedly connected to the separation member 32 at one end and directly fixedly connected to the separation slider 55 at the other end. The flexible member 54 may also be configured as a tension spring.

Embodiment 9

Unless otherwise specified, the structure of the developing cartridge in Embodiment 9 is the same as that in Embodiment 8. The main difference between Embodiment 9 and Embodiment 8 is that the arrangement of the flexible member is different.

As shown in FIGS. 44 to 47, a first connection part is fixedly provided on the first protective cover 111 at the first side 11 of the casing 10, and a second connection part is fixedly provided on the support member 31 at the second side 12 of the casing 10. The first connection part includes a first extension part 521 extending to the right in the first direction and a second extension part 522 extending downward from the right end of the first extension part 521, and the right end of the flexible member 54 is fixedly connected to the second extension part 522. The second connection part includes a third extension part 531 extending to the left in the first direction and a fourth extension part 532 extending downward from the left end of the third extension part 531, and the left end of the flexible member 54 is fixedly connected to the fourth extension part 532. The flexible member 54 extends from the first side 11 to the second side 12 of the casing 10 in the first direction.

The lower end of the separation member 32 abuts against a part between the left end and the right end of the flexible member 54.

When the developing cartridge 1 is mounted on the drum cartridge 2, the second sidewall 22 is positioned between the separation member 32 and the fourth extension part 532 in the first direction, and the flexible member 54 between the separation member 32 and the fourth extension part 532 is compressed by the second sidewall 22 and bent. Similarly, the first sidewall 21 is positioned between the first protective cover 111 and the second extension part 522, and the flexible member 54 between the first protective cover 111 and the second extension part 522 is compressed by the first sidewall 21 and bent.

When the developing roller 131 needs to be out of contact with the photosensitive drum 23, the image-forming device applies a separation force to the separation member 32, so that the separation member 32 slides downward along the support part 311, thereby pushing the flexible member 54. Accordingly, the flexible member 54 is gradually straightened. The part of the flexible member 54 that contacts the first sidewall 21 and the second sidewall 22 then applies a force to the first sidewall 21 and the second sidewall 22. At the same time, the first sidewall 21 and the second sidewall 22 apply an upward reaction force to the flexible member 54. Meanwhile, the position where the flexible member 54 contacts the first sidewall 21 and the second sidewall 22 is at a distance from the first guided part 122 and the second guided part 313 in the front-to-back direction. That is, the reaction force acts on the position where the casing 10 deviates from the line connecting the first guided part 122 and the second guided part 313, so that the casing 10 can rotate clockwise around the line connecting the first guided part 122 and the second guided part 313 by a certain angle, thereby realizing the separation of the developing roller 131 and the photosensitive drum 23.

Embodiment 10

Figure 48:
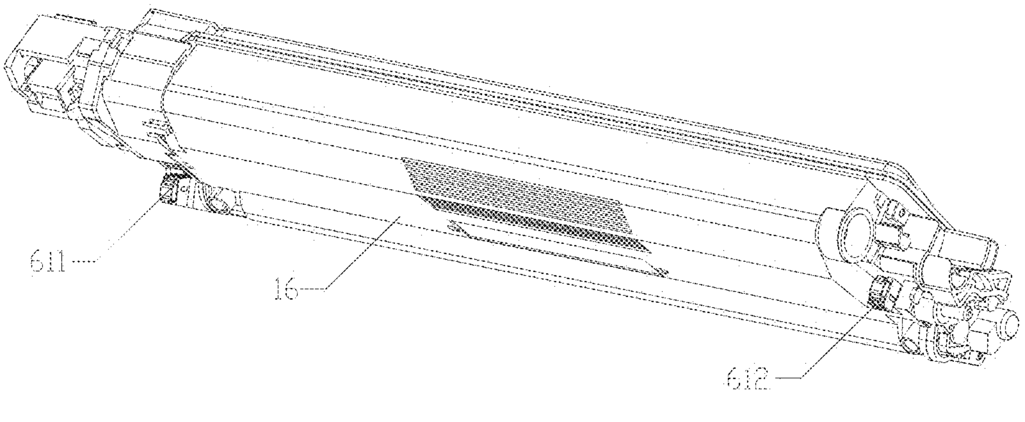
FIG. 48 is a schematic structural diagram of a developing cartridge in Embodiment 10.
Figure 49:
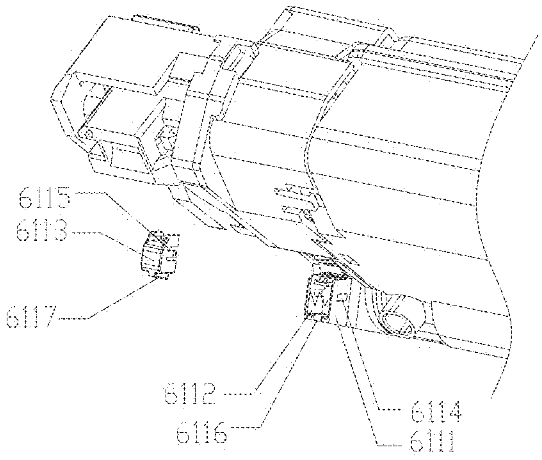
FIG. 49 is a schematic diagram of an exploded structure of a first forced pushing part in Embodiment 10.

As shown in FIG. 48 and FIG. 49, Embodiment 10 discloses a forced pushing assembly different from that of Embodiment 1.

As shown in FIG. 49, the forced pushing assembly includes a first forced pushing part 611 and a second forced pushing part 612. In the disclosed embodiment, the first forced pushing part 611 has the same structure as the second forced pushing part 612. The first forced pushing part 611 includes a first retention member 6111, a first elastic component 6112, and a first contact member 6113, and the second forced pushing part 612 includes a second retention member, a second elastic component, and a second contact member. The structure of the first forced pushing part 611 is taken as an example for detailed description. The first retention member 6111 is fixedly arranged at the first side 11 of the casing 10. Specifically, the first retention member 6111 is integrally formed and fixedly arranged at the lower end of the first protective cover 111. The first retention member 6111 is in the shape of a groove recessed forward. The first contact member 6113 can be slidably mounted in the sliding hole along the first retention member 6111. The left and right walls of the first retention member 6111 are provided with a first limiting hole 6114 extending in the second direction. The first contact member 6113 is provided with a first claw 6115. The first claw 6115 is inserted into the first limiting hole 6114 and can move relative to the first limiting hole 6114. The first limiting hole 6114 can abut against the first claw 6115 to limit the moving range of the first contact member 6113 in the front and rear directions. A guide slot 6116 extending in the second direction is further provided on the lower wall of the first retention member 6111, and a guide rib 6117 inserted into the guide slot 6116 and abutting against the left and right walls of the guide slot 6116 is provided on the first contact member 6113. The guide slot 6116 is configured to limit the displacement of the first contact member 6113 in the left and right directions. The first elastic component 6112 is disposed between the front wall of the first retention member 6111 and the first contact member 6113. One end of the first elastic component 6112 abuts against the front wall of the first retention member 6111, and the other end abuts against the first contact member 6113. The first elastic component 6112 extends in the front-back direction.

When viewed in the third direction, the projection of the driving gear 402 overlaps with the projection of the first forced pushing part 611, which may be a partial overlap or a complete overlap.

The difference between the second forced pushing part 612 and the first forced pushing part 611 is that the second retention member is fixedly disposed at the second side 12 of the casing 10 by means of integral molding, and the rest of the structure is the same or similar to that of the first forced pushing part 611.

The second forced pushing part 612 is positioned behind the first forced pushing part 611 in the second direction, that is, the distance between the first forced pushing part 611 and the developing roller 131 in the second direction is smaller than the distance between the second forced pushing part 612 and the developing roller 131.

When the developing cartridge 1 is mounted on the drum cartridge 2, the first contact member 6113 and the second contact member abut against the drum cartridge 2 so that the developing cartridge 1 receives the reaction force of the drum cartridge 2, so that the first elastic component 6112 and the second elastic component are compressed in the second direction. The casing 10 then moves forward under the reaction force of the drum cartridge 2 so that the developing roller 131 presses forward against the surface of the photosensitive drum 23, thereby ensuring close contact between the developing roller 131 and the photosensitive drum 23.

Embodiment 11

Unless otherwise specified, the structure of the developing cartridge in Embodiment 11 is the same as that in Embodiment 1. The main difference between Embodiment 11 and Embodiment 1 is the different structure of the transmission assembly.

Figure 50:
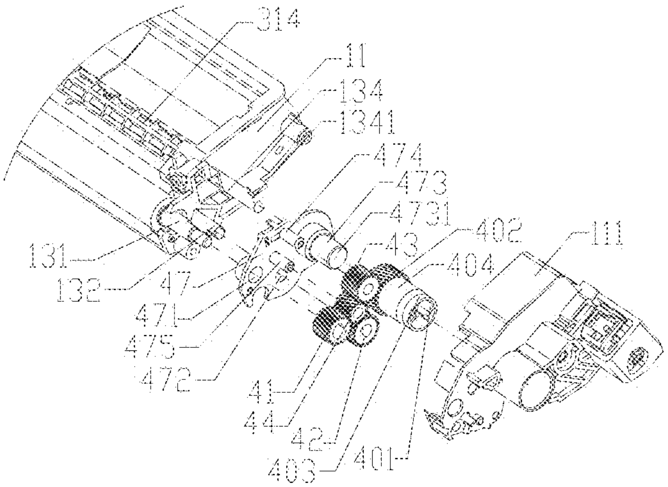
FIG. 50 is an exploded view of a developing cartridge in Embodiment 11.
Figure 51:
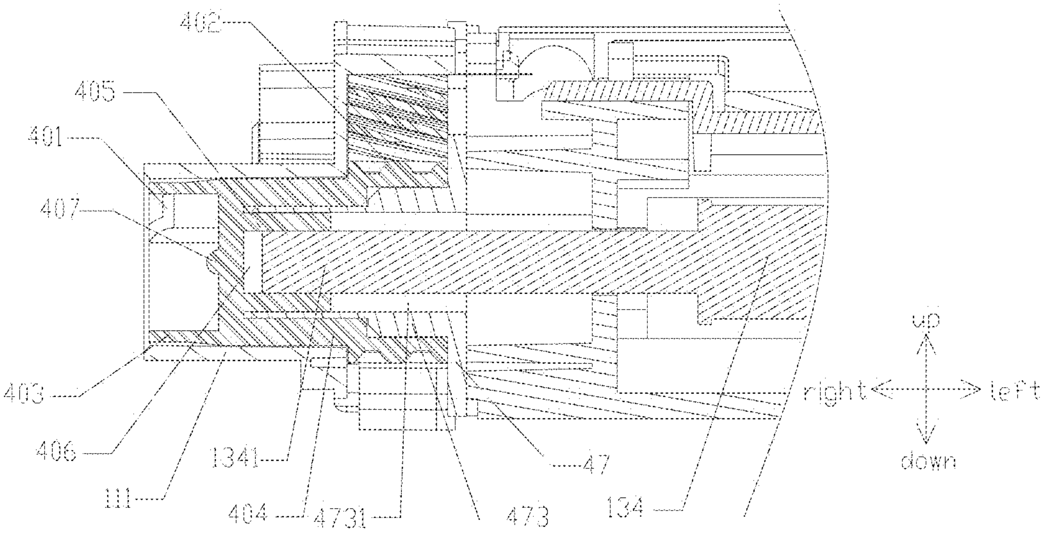
FIG. 51 is a cross-sectional view of a developing cartridge in Embodiment 11.
Figure 52:
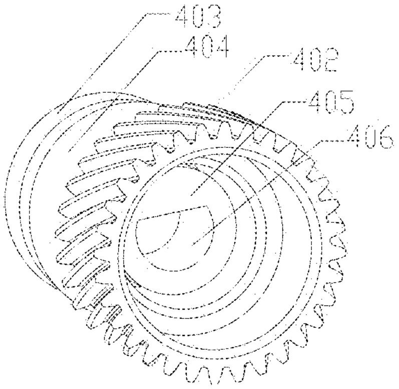
FIG. 52 is a schematic structural diagram of a coupling in Embodiment 11.

As shown in FIGS. 50 to 52, the transmission assembly eliminates the agitator gear 46 and the third idler gear 45. The first side 11 of the casing 10 is detachably fixedly mounted with a first bearing 47 by means of screws or buckles. The first bearing 47 is provided with a second developing support hole 471 and a second powder-feeding support hole 472 that penetrate the first bearing 47 in the first direction. The right end of the developing roller 131 and the right end of the developer feeding roller 132 are respectively inserted into the second developing support hole 471 and the second powder-feeding support hole 472 and are rotatably supported. The developing gear 41 and the developer feeding gear 42 are positioned on the right side of the first bearing 47 and are coaxially fixedly mounted to the right end of the developing roller 131 and the right end of the developer feeding roller 132. A first support shaft 474 and a second support shaft 475 protruding to the right are integrally formed on the right surface of the first bearing 47. The first idler gear 43 is coaxially mounted on the first support shaft 474 and is rotatably supported by the first support shaft 474. The second idler gear 44 is coaxially mounted on the second support shaft 475 and is rotatably supported by the second support shaft 475.

As shown in FIGS. 50 to 52, the first bearing 47 is also integrally formed with a driving support shaft 473 protruding to the right, and the coupling 40 is coaxially mounted on the driving support shaft 473 and rotatably supported by the driving support shaft 473. The driving gear 402 is meshed with the first idler gear 43, the first idler gear 43 is meshed with the second idler gear 44, and the second idler gear 44 is meshed with the developing gear 41 and the developer feeding gear 42 at the same time to transmit driving-force. In the second direction, the first idler gear 43 and the second idler gear 44 are positioned between the rotation axis of the coupling 40 and the rotation axis of the developing gear 41. Through the above design, the developing gear 41 and the developer feeding gear 42 are driven at the same time, avoiding the asynchronous rotation of the developing roller 131 and the developer feeding roller 132.

As shown in FIG. 50, the agitator 134 is arranged to rotate coaxially with the coupling 40, and the right end of the agitator 134 extends out of the first side 11 of the casing 10. The first bearing 47 is provided with a first through-hole 4731 for the right end of the agitator 134 to pass through. The driving support shaft 473 is a hollow cylindrical shape, and the first through-hole 4731 is surrounded by the driving support shaft 473 inside the driving support shaft 473, so that the right end of the agitator 134 extends into the interior of the driving support shaft 473 through the first through-hole 4731.

As shown in FIGS. 51 and 52, the coupling 40 includes a first circular tube part 403, a second circular tube part 404, a partition plate 407, a force receiving part 401, and a driving gear 402, which are integrally formed or separately fixedly connected as one.

As shown in FIGS. 50 to 52, the disclosed embodiment specifically introduces an integrally formed coupling 40, the central axes of the first circular tube part 403 and the second circular tube part 404 are parallel to the first direction, the central axes of the first circular tube part 403 and the second circular tube part 404 are coaxial, the partition plate 407 is positioned between the first circular tube part 403 and the second circular tube part 404 in the first direction. The first circular tube part 403 and the second circular tube part 404 are integrally connected together through the partition plate 407, and the first circular tube part 403 is further to the right (that is, farther away from the casing 10) than the second circular tube part 404. The force receiving part 401 is integrally formed inside the first circular tube part 403. The force receiving part 401 protrudes along the radial direction of the first circular tube part 403 toward the direction close to the central axis of the first circular tube part 403, and the force receiving part 401 is integrally connected to the inner circumferential surface of the first circular tube part 403 and the right end surface of the partition plate 407.

As shown in FIGS. 50 to 52, the driving gear 402 is coaxially and integrally formed with the second circular tube part 404 and is arranged on the outer peripheral surface of the second circular tube part 404. The driving gear 402 is further to the left (i.e., closer to the casing 10) than the force receiving part 401, and a transmission column 405 coaxial with the driving gear 402 is integrally formed on the left end surface of the partition plate 407. A transmission hole 406 formed by being recessed from left to right is integrally formed on the transmission column 405. The transmission hole 406 is a D-shaped hole, and a D-shaped part 1341 matching the transmission hole 406 is provided at the right end of the agitator 134. The D-shaped part 1341 is inserted into the D-shaped hole so that the driving-force of the coupling 40 can be directly transmitted to the agitator 134 without the need for transmission through an intermediate gear, thereby simplifying the structure, reducing the number of parts, and reducing costs.

The agitator 134 in the disclosed embodiment is closer to the developing roller 131 and the developer feeding roller 132 in the front-to-back direction than the existing technologies (in the existing technologies, the rotation axis of the agitator 134 is farther from the rotation axis of the developing roller 131 in the front-to-back direction than the rotation axis of the force receiving part 401). When the developing cartridge disclosed in the disclosed embodiment is mounted in the image-forming device, if the direction of gravity is roughly parallel to the second direction (i.e., the front-to-back direction), the developer in the casing 10 will naturally fall toward the front end of the casing 10 (i.e., the third side 13 where the developing roller 131 is positioned) under the action of gravity. The developer thus will not accumulate at the rear end of the casing 10. Therefore, setting the agitator 134 to be coaxial with the coupling 40 can improve the stirring efficiency and avoid the agitator 134 stirring to a position where there is no developer. In some embodiments, the agitator 134 may not be provided, and only gravity is used to make the developer flow in the direction of gravity, and the developer is transferred to the developer feeding roller 132 and the developing roller 131. If the direction of gravity is substantially perpendicular to the second direction, the agitator 134 may be provided with blades or the agitator blades may be enlarged so that the agitator 134 can more fully stir the developer in the casing 10.

Beneficial effects of the present disclosure include: the developing cartridge of the present disclosure is merely provided with a separation member at the first side or the second side, and the developing roller and the photosensitive drum can be separated by merely receiving the separation force of the separation force output member or the drum cartridge. The developing cartridge has a simple structure, stable movement, and lower cost.

The foregoing are merely some embodiments of the present disclosure. For those skilled in the art, various modifications and improvements can be made without departing from the creative concept of the present disclosure, which all belong to the protection scope of the present disclosure.

What is claimed is:

1. A developing cartridge, comprising:

a casing configured to accommodate developer therein, the casing having a first side and a second side arranged oppositely in a first direction, and a third side and a fourth side arranged oppositely in a second direction, the first direction and the second direction intersecting;

a developing roller rotatable about a first axis extending in the first direction, the developing roller being positioned at the third side;

a coupling rotatable about a second axis extending in the first direction, the coupling being positioned at the first side;

a storage medium including an electrical contact surface, the electrical contact surface being positioned at the first side;

a separation member protruding in the first direction, the separation member receiving a separation force to cause the casing to move, and the separation member being positioned at the first side; and an abutting member positioned at the second side, the abutting member being able to contact with a drum cartridge, wherein the separation member causes the casing to swing with the abutting member as a fulcrum.

2. The developing cartridge according to claim 1, wherein the developing roller contacts a photosensitive drum of the drum cartridge, the separation member causes the developing roller to be out of contact with the photosensitive drum, and the abutting member is positioned outside a contact position of the developing roller with the photosensitive drum in the first direction.

3. The developing cartridge according to claim 2, wherein, when the developing roller is out of contact with the photosensitive drum, a gap between the developing roller and the photosensitive drum gradually decreases in a direction from the first side to the second side in the first direction.

4. The developing cartridge according to claim 1, wherein the abutting member is farther away from the electrical contact surface than the second axis in the second direction.

5. The developing cartridge according to claim 1, wherein the abutting member at least partially overlaps the developing roller when viewed in the first direction.

6. The developing cartridge according to claim 5, wherein a guided part is provided at the second side, the guided part being able to contact with the drum cartridge to guide the installation of the developing cartridge to the drum cartridge, the abutting member protrudes radially relative to the guided part, and the abutting member is an arc-shaped concave portion.

7. The developing cartridge according to claim 1, wherein a guided part is provided at the first side, the guided part being able to contact with the drum cartridge to guide the developing cartridge to be installed to the drum cartridge, and the separation member protrudes in the first direction relative to the guided part.

8. The developing cartridge according to claim 1, further comprising another abutting member positioned at the second side, and the another abutting member extends in the first direction.

9. The developing cartridge according to claim 8, further comprising a forced pushing part, wherein the forced pushing part receives a forced pushing force, and the abutting member is further away from the first axis than the forced pushing part in the second direction.

10. The developing cartridge according to claim 1, wherein the separation member includes a separation slope intersecting the first direction and the second direction, and the separation member causes the casing to swing.

11. The developing cartridge according to claim 1, further comprising a forced pushing part, wherein the forced pushing part receives a forced pushing force, the forced pushing part is positioned at the second side, the forced pushing part is made of a conductive material, and in the second direction, the forced pushing part is closer to the fourth side than the abutting member.

12. A developing cartridge, detachably mounted on a drum cartridge including a photosensitive drum, the developing cartridge comprising:

a casing configured to accommodate developer therein, the casing having a first side and a second side arranged oppositely in a first direction, and a third side and a fourth side arranged oppositely in a second direction, the first direction and the second direction intersecting;

a developing roller rotatable about a first axis extending in the first direction, the developing roller being positioned at the third side, and the developing roller contacting the photosensitive drum;

a coupling rotatable about a second axis extending in the first direction, the coupling being positioned at the first side;

a storage medium including an electrical contact surface, the electrical contact surface being positioned at the first side;

a separation member being positioned at the second side, the separation member receiving a separation force to cause the second side to move in a direction away from the photosensitive drum; and an abutting member positioned at the first side, the abutting member being able to contact with an external component to cause the first side to swing away from the photosensitive drum.

13. The developing cartridge according to claim 12, wherein the second side is provided with another abutting member, the another abutting member contacts another external component, the other external component is different from the external component, the another abutting member is arranged diagonally with the abutting member, and a distance between the another abutting member and the developing roller is smaller than a distance between the abutting member and the developing roller in the second direction.

14. The developing cartridge according to claim 13, wherein the casing moves away from the photosensitive drum by swinging with the abutting member and the another abutting member as fulcrums.

15. The developing cartridge according to claim 13, wherein:

the first side is provided with a bracket, the bracket supports the electrical contact surface, the bracket is the abutting member; and the second side is provided with a guided part, and the guided part is the another abutting member.

16. The developing cartridge according to claim 12, wherein, a contact position of the abutting member with the external component is positioned outside a contact position of the developing roller with the photosensitive drum in the first direction.

17. The developing cartridge according to claim 16, wherein, when the developing roller is out of contact with the photosensitive drum, a gap between the developing roller and the photosensitive drum gradually decreases in a direction from the second side to the first side in the first direction.

18. The developing cartridge according to claim 12, wherein the separation member slides relative to the casing after receiving the separation force, and a sliding direction of the separation member intersects with the first direction, the separation member includes a force-bearing part and a force-applying part, the force-bearing part receives the separation force to make the separation member move relative to the casing, and the force-applying part is an inclined surface whose extension direction intersects with the first direction and the second direction.

19. The developing cartridge according to claim 12, further comprising a forced pushing part, the forced pushing part is positioned at the second side, the forced pushing part is made of a conductive material, the forced pushing part receives a forced pushing force, and the forced pushing force acts in a direction opposite to the separation force.

* * * * *